US010922697B2

(12) United States Patent
Neilson et al.

(10) Patent No.: US 10,922,697 B2
(45) Date of Patent: Feb. 16, 2021

(54) CREDIBILITY TECHNIQUES

(71) Applicant: Credibility, LLC, South Jordan, UT (US)

(72) Inventors: M. Todd Neilson, South Jordan, UT (US); Stuart Parker, South Jordan, UT (US)

(73) Assignee: Credibility, LLC, South Jordan, UT (US)

( * ) Notice: Subject to any disclaimer, the term of this patent is extended or adjusted under 35 U.S.C. 154(b) by 712 days.

(21) Appl. No.: 14/179,048

(22) Filed: Feb. 12, 2014

(65) Prior Publication Data

US 2014/0279605 A1 Sep. 18, 2014

Related U.S. Application Data

(60) Provisional application No. 61/776,840, filed on Mar. 12, 2013.

(51) Int. Cl.
*G06F 3/048* (2013.01)
*G06Q 30/00* (2012.01)

(52) U.S. Cl.
CPC . *G06Q 30/018* (2013.01); *G06F 2203/04802* (2013.01)

(58) Field of Classification Search
CPC .............................. G06Q 30/00; G06Q 30/18
See application file for complete search history.

(56) References Cited

U.S. PATENT DOCUMENTS

| | | | | |
|---|---|---|---|---|
| 5,767,855 | A * | 6/1998 | Bardon | G06F 3/04815 345/419 |
| 6,606,374 | B1 * | 8/2003 | Rokoff | H04M 3/4938 379/88.16 |
| 7,216,305 | B1 * | 5/2007 | Jaeger | G06F 3/0481 345/419 |
| 8,537,157 | B2 * | 9/2013 | Adimatyam | G06F 3/017 345/156 |
| 8,561,167 | B2 * | 10/2013 | Alperovitch | H04L 63/1425 709/223 |
| 9,360,991 | B2 * | 6/2016 | Celebisoy | G06F 3/04817 |
| 9,448,972 | B2 * | 9/2016 | Greenberg | G06F 40/106 |
| 2002/0169836 | A1 * | 11/2002 | Hood | G06O 30/02 709/206 |

(Continued)

OTHER PUBLICATIONS

Linda Chang, Fold a modular origami business card cube, Jun. 9, 2010 https://origami.wonderhowto.com/how-to/fold-modular-origami-business-card-cube-373622/ (Year: 2010).*

(Continued)

*Primary Examiner* — Kambiz Abdi
*Assistant Examiner* — Dipen M Patel
(74) *Attorney, Agent, or Firm* — J. Richard Bucher; TechLaw Ventures, PLLC

(57) ABSTRACT

This patent application relates to credibility techniques for allowing an entity to leverage its credibility in an automated, standardized, and convenient manner. A credibility manifestation (e.g. a credibility cube) is described for representing, managing, validating, and/or conveying the entity's credibility profile to specific prospects. An automated credibility management system (CMS) is also described for creating and leveraging the credibility manifestation.

14 Claims, 18 Drawing Sheets

(56) References Cited

U.S. PATENT DOCUMENTS

| | | | | |
|---|---|---|---|---|
| 2003/0058241 A1* | 3/2003 | Hsu | ............ | G06T 15/60 |
| | | | | 345/426 |
| 2003/0112938 A1* | 6/2003 | Kanakubo | ............ | H04M 1/6505 |
| | | | | 379/142.17 |
| 2004/0122846 A1* | 6/2004 | Chess | ............ | G06F 17/30864 |
| 2006/0287970 A1* | 12/2006 | Chess | ............ | G06Q 10/10 |
| 2007/0070066 A1* | 3/2007 | Bakhash | ............ | G06F 3/04815 |
| | | | | 345/419 |
| 2008/0186305 A1* | 8/2008 | Carter | ............ | G06T 15/04 |
| | | | | 345/419 |
| 2008/0235629 A1* | 9/2008 | Porter | ............ | G06F 3/0481 |
| | | | | 715/849 |
| 2008/0313042 A1* | 12/2008 | Shields | ............ | G06Q 30/02 |
| | | | | 705/14.4 |
| 2010/0145958 A1* | 6/2010 | Duffy | ............ | G06Q 10/00 |
| | | | | 707/755 |
| 2010/0169836 A1* | 7/2010 | Stallings | ............ | G06F 3/04817 |
| | | | | 715/848 |
| 2011/0310100 A1* | 12/2011 | Adimatyam | ............ | G06F 3/017 |
| | | | | 345/420 |
| 2012/0054622 A1* | 3/2012 | Nankani | ............ | G06F 3/04815 |
| | | | | 715/730 |
| 2012/0110087 A1* | 5/2012 | Culver | ............ | G06F 17/5004 |
| | | | | 709/205 |
| 2012/0260209 A1* | 10/2012 | Stibel | ............ | G06Q 30/018 |
| | | | | 715/780 |
| 2012/0260218 A1* | 10/2012 | Bawel | ............ | G06F 3/04815 |
| | | | | 715/841 |
| 2014/0129463 A1* | 5/2014 | Grayevsky | ............ | G06Q 10/1053 |
| | | | | 705/321 |
| 2014/0129464 A1* | 5/2014 | Grayevsky | ............ | G06Q 10/06 |
| | | | | 705/321 |
| 2014/0164994 A1* | 6/2014 | Myslinski | ............ | G06F 1/163 |
| | | | | 715/808 |

OTHER PUBLICATIONS

Ned Batchelder, How to make business card cubes, Jun. 3, 2003 http://nedbatchelder.com/text/cardcube.html (Year: 2003).*

Business Card Origami Cube, Feb. 21, 2010 https://web.archive.org/web/20100221223927/http://www.origami-resource-center.com/business-card-origami-cube.html (Year: 2010).*

\* cited by examiner

SCREENSHOT 400

CREDIBILITY QUESTIONS  ⊠

| 🔍 |  |  |
|---|---|---|
| Service Cube ◆ | | |

— 404

| Questions | Sort Order | Edit |
|---|---|---|
| 1. Introduce A1. Is there a disclosure statement you need to make? | ▶ | edit |
| 2. How does A1's service work? | ▶ ◀ | edit |
| 3. What is the VALUE or BENEFIT that A1's service provides? | ▶ ◀ | edit |
| 4. Why is A1 and its service unique? | ▶ ◀ | edit |
| 5. Why should customers TRUST and have CONFIDENCE in A1? | ◀ | edit |

— 408    — 410    — 406

WEBPAGE 402

[ PREVIOUS ]                    [ SAVE ]  [ CONTINUE ]

FIG. 4

SCREENSHOT 500

MY CREDIBILITY STATEMENT

510 — 14% Complete

QUESTION: *Why is A1 and its service unique?* — 504

506

Type your message here...

508

WHY IS THIS QUESTION IMPORTANT?
*Your "power message" statement identifies what makes A1...*

WEBPAGE 502

PREVIOUS          SAVE   CONTINUE

FIG. 5

ALGORITHM 1400

ALGORITHM 1500

ALGORITHM 1600

ALGORITHM 1700

ALGORITHM 1800

US 10,922,697 B2

CREDIBILITY TECHNIQUES

CROSS REFERENCE TO RELATED APPLICATION

This application claims the benefit of U.S. Provisional Application No. 61/776,840, filed Mar. 12, 2013, which is hereby incorporated by reference herein in its entirety, including but not limited to those portions that specifically appear hereinafter, the incorporation by reference being made with the following exception: In the event that any portion of the above-referenced provisional application is inconsistent with this application, this application supersedes said above-referenced provisional application.

BACKGROUND

Currently, there is no standardized or convenient way for an entity to represent, manage, or convey their credibility to others. Those seeking to assess or validate another's credibility are thus left without a standardized or convenient way to do so.

SUMMARY

Credibility techniques are described that allow an entity to leverage its credibility in an automated, standardized, and convenient manner. More particularly, these techniques provide a credibility manifestation (e.g. a credibility cube or other shape) that can be utilized to create, represent, manage, validate, and/or convey the entity's credibility profile to specific recipients (i.e. prospects) in a convenient and automated manner.

In at least one embodiment, a credibility cube can be created and sent to a prospect. The credibility cube can include a credibility profile of the entity, and can be configured and utilized to represent and convey the credibility profile to the prospect. To accomplish this, the credibility cube can include a claim by the entity about the entity's credibility (i.e. credibility claim) that has been validated by one or more references (i.e. validated credibility claim).

In at least one embodiment, credibility coaching services and/or management services can be provided by an automated credibility management system (CMS). For example, the CMS can be configured to assist the entity in creating, utilizing, managing, and/or leveraging their credibility profile, and/or in creating a credibility cube that includes the credibility profile. To help accomplish this, the CMS can include (i.e. be configured with) a credibility wizard tool, interactive media tool, and/or voice analysis tool for instance.

BRIEF DESCRIPTION OF THE DRAWINGS

The accompanying drawings illustrate implementations of the concepts conveyed in the present application. Features of the illustrated embodiments can be more readily understood by reference to the following description taken in conjunction with the accompanying drawings. Like reference numbers in the various drawings are used wherever feasible to indicate like elements.

FIGS. 3-6 each illustrate a screenshot from an example webpage, in accordance with at least one embodiment.

DETAILED DESCRIPTION

Overview

Figure 1:
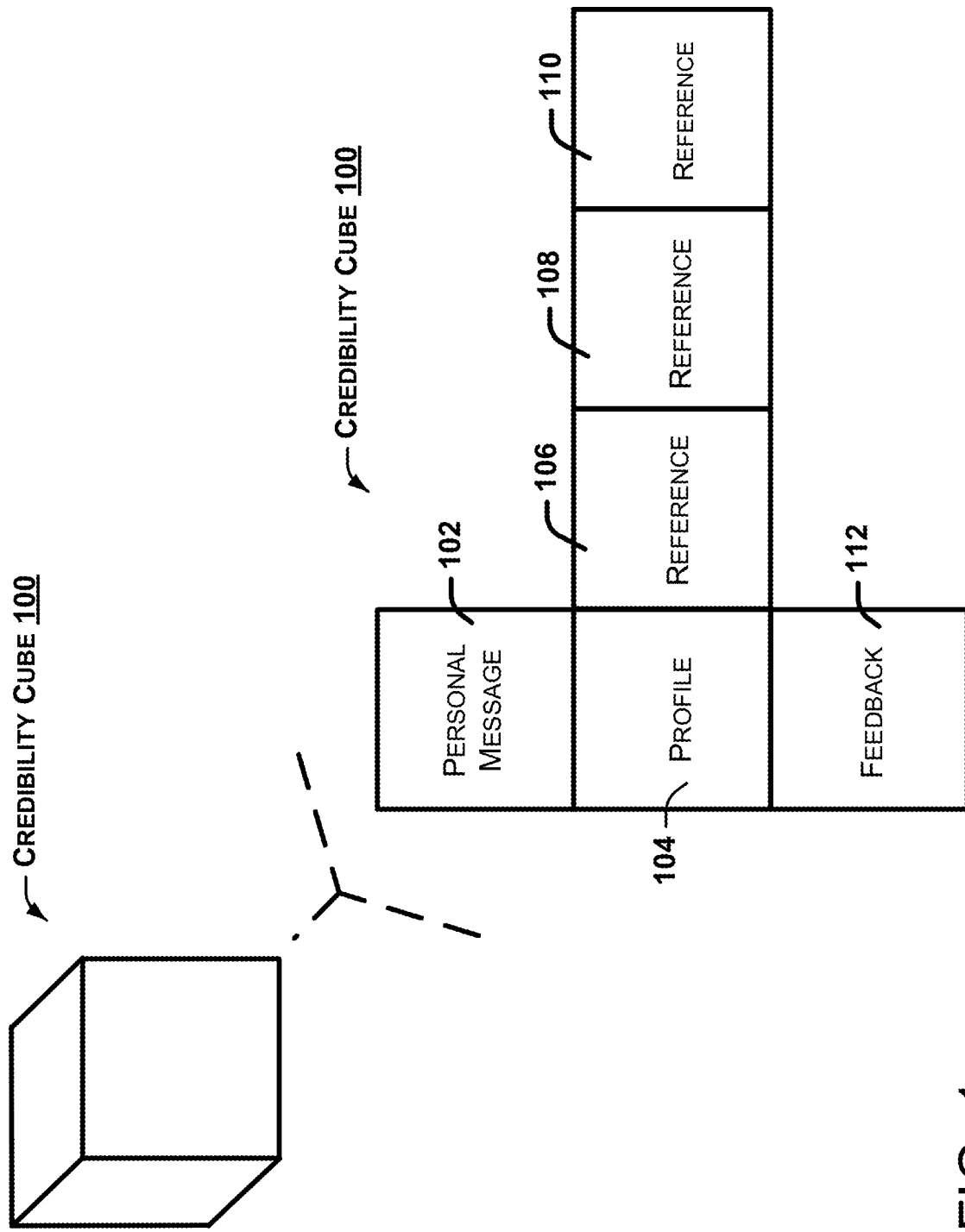
FIG. 1 illustrates an example credibility cube that may be implemented, in accordance with at least one embodiment.

Credibility techniques are described that allow an entity to leverage its credibility in an automated, standardized, and convenient manner. More particularly, these techniques provide a credibility manifestation (e.g. a credibility cube or other shape) that can be configured and utilized to represent, manage, validate, and/or convey the entity's credibility profile to specific recipients (i.e. prospects) in a convenient and automated manner. For example, the manifestation can represent, manage, validate, and/or convey certain characteristics associated with the entity's credibility, such as the entity's character, credentials, competence, and/or consistency for instance.

The credibility manifestation, and thus the entity's credibility profile, can include validated credibility claims about the entity's credibility. These credibility claims can be utilized to represent, manage, demonstrate, and/or convey (i.e. communicate) the entity's credibility to prospects. For example, these claims may represent, demonstrate, and/or convey the entity's character, credentials, competence, and/or consistency. Once the prospects receive the credibility manifestation, they can easily access the manifestation to assess the entity's credibility profile by reviewing the validated credibility claims.

Without limitation, an entity's credibility (e.g. character, credentials, competence, and/or consistency) can be associated with a product, service, opportunity, and/or an individual. Therefore, a credibility cube can be utilized as a way to describe and share the entity's credibility with respect to that product, service, opportunity, or individual. Said another way, a credibility cube can include a product, service, opportunity, and/or individual. Alternatively or additionally, a credibility cube can include, and thus be utilized as a way to share, video and/or other types of media.

For purposes of this discussion, an entity can be one or more persons, companies, organizations, groups, products, services, or other types of things that can be associated with credibility, and that a credibility profile can be associated with. Thus, an entity may also be referred to herein as a credibility owner.

In at least one embodiment, the entity (i.e. credibility owner) can create their credibility profile on a credibility cube by first recording (e.g. in audio and/or video) one or more credibility claims on a credibility cube. The credibility claim(s) may, for instance, describe or otherwise be associated with the entity's credibility, such the entity's character, credentials, competence, and/or consistency for instance.

This can be accomplished in any suitable way. For example, the credibility owner may receive credibility coaching to assist them in creating and recording their credibility claims using an interactive process.

Once the credibility owner's credibility claim(s) have been recorded on the credibility cube, one or more others (i.e. references) can be asked to independently validate (i.e. substantiate) the claim(s) by recording their response(s) to each claim. For example, the references may be asked to validate specific credibility claims about the entity's character, credentials, competence, and/or consistency.

This can be accomplished in any suitable way. For example, each reference can be sent an email asking them to record their response. When the reference agrees, they can be automatically linked (i.e. via a uniform resource locator (URL) or other type of link) to a credibility application and/or site that renders an introductory message about the credibility owner, presents each credibility claim, and allows the reference to record their response(s).

Once each reference's responses have been recorded and provided back to the credibility owner, the owner can select some or all of the recorded responses to be included on the credibility cube before leveraging their credibility by sending the cube (with the credibility claim(s) and selected responses) to one or more specific prospects. Each prospect may then utilize the received cube to evaluate and/or confirm the credibility owner's credibility profile by reviewing and assessing the validated credibility claim(s) (i.e. the credibility claim(s) and corresponding responses) on the credibility cube.

In at least one embodiment, each of the six sides of a credibility cube can be configured to collectively serve as a source of credibility information that provides structure and meaning to the credibility owner's credibility profile. For example, the credibility cube might include a profile side to create, manage, and/or represent the owner's credibility profile, a personal message side to introduce the owner to a particular prospect, multiple reference sides that serve to validate the owner's credibility claims, and a feedback side to convey feedback from a prospect to the owner.

Alternatively or additionally, the cube might include a media side that allows pre-formatted uploaded video and/or other types of media from an external source to be rendered and experienced.

In at least one embodiment, an automated credibility management system (CMS) can be configured to assist the credibility owner in creating, representing, managing, validating, and/or conveying their credibility with one or more credibility profiles and one or more credibility cubes. For purposes of discussion, a credibility owner that utilizes functionality provided by the CMS (i.e. CMS functionality) may be considered a client of the CMS, and thus may also be referred to herein as a client.

As an example, in at least one embodiment, the CMS may provide a login process that can be utilized to engage a potential client and/or to verify an existing client, and initiate the client's access to CMS functionality. Without limitation, this CMS functionality might include credibility coaching and/or management services provided via a credibility wizard tool, an interactive media (e.g. video) tool, and/or a voice analysis tool. Said another way, the CMS can include (i.e. be configured with) a credibility wizard tool, interactive media tool, and/or voice analysis tool to provide some or all of the CMS's credibility coaching and/or management services to clients.

In at least one embodiment for instance, credibility coaching can be provided to the client to assist the client in creating, utilizing, managing, and/or leveraging one or more credibility cubes. This credibility coaching may be performed by one or more persons, by the automated CMS, or by a combination thereof.

For example, the CMS might be configured to utilize the credibility wizard tool to assist the client in creating their credibility profile on credibility cube(s). Said another way, the CMS can be configured to perform at least part of creating the credibility profile. This might include the credibility wizard tool interactively walking the client through the process of selecting credibility questions, recording answers to the questions as credibility claims, and validating the credibility claims by requesting references' responses to the credibility claims.

In some embodiments, a voice analysis tool can be configured and utilized to evaluate the credibility claims and/or reference responses and to provide voice analysis feedback to the client, a credibility coach, and/or one or more others. This voice analysis feedback might include, for instance, objective results that can be used to improve (e.g. strengthen) the client's validated credibility claims. Alternatively or additionally, the objective results might be provided to, and/or utilized by, a prospect to assist them in evaluating and confirming the client's credibility profile. Without limitation, characteristics such as an entity's character, credentials, competence, and consistency (e.g. as presented via a credibility cube) may be considered (e.g. by a prospect) in order to evaluate and/or confirm an entity's credibility.

In at least one example, the voice analysis tool can be configured to utilize (e.g. measure, account for, evaluate, assess, rank/score, etc.) multiple voice analytic criteria to provide the voice analysis feedback. Without limitation, these analytic criteria can include voice characteristics associated with a subject's (e.g. an entity's) hesitation, stress level, excitement level, cognitive emotion, embarrassment, anger, energy, enthusiasm, and/or uncertainty for instance.

A particular credibility owner's credibility profile, as represented and conveyed (i.e. communicated) by one or more credibility cubes or other types of manifestations, can be associated with a product, service, and/or opportunity that is provided or sought by the entity, and/or can be associated with the credibility owner as an individual. Accordingly, any number and type of credibility cubes might be created and utilized in accordance with the described techniques.

Without limitation, example types of credibility cubes can include: service credibility cubes with a credibility profile about a service that the credibility owner can provide, product credibility cubes with a credibility profile about a product or resource that the owner can provide, opportunity credibility cubes about an opportunity the owner can provide, video cubes with pre-recorded video segments about any topic, individual credibility cubes with a credibility profile about an individual who is the owner and seeking and/or providing an opportunity, and referral cubes to facilitate and incentivize referrals between individual credibility owners (e.g. between members of a CMS).

A particular credibility owner might create and utilize any number and type of credibility cubes. For example, an owner that is a software company might provide a software application (a product) that can be installed and maintained (serviced) by the company. Product credibility cubes might therefore be used in order to help sell the company's software application product, while service credibility cubes might be used to sale the company's installation and maintenance services.

As another example, there might be opportunities for individuals who are entities to join and/or invest in the company and for other companies to collaborate with and/or invest in the company. Opportunity credibility cubes might thus be used in order to describe and/or sell these opportunities to talented prospective employees and/or investors (i.e. prospects). Individuals within the company, such as sales representatives and software installers for instance, own their personal credibility and thus may utilize individual credibility cubes to help convey their personal credibility and expertise (e.g. with respect to products and/or services of the company) to prospective customers or employers (i.e. prospects).

In at least one embodiment, the CMS can be implemented in a credibility framework or system that includes one or more computing devices. In this regard, and as described herein, some or all of the functionality associated with the CMS can be performed at least in part by one or more tools that may be implemented in the credibility framework or system.

In at least one embodiment, a credibility referral service might be provided that utilizes referral credibility cubes to facilitate and incentivize referrals for a client's products or services to other clients (referral prospects) for a referral fee. For example, some or all of a credibility referral service might be implemented as part of the CMS in the credibility framework or system.

Such a credibility referral service might, for instance, be utilized to provide information about a product, service, opportunity or individual via one or more referral credibility cubes that can be sent to a third party as a recommendation. Such a recommendation may be evaluated by a referral prospect that receives a credibility cube by reviewing and assessing credibility claims and validations on the cube. Referral credibility cubes may include an additional credibility claim by the referring party to the referred party. This additional credibility claim can also be evaluated by the referral prospect.

In at least one embodiment, a video cube can include pre-formatted video segments uploaded into the cube by the user/client or recorded as a free-form video on a side of the cube. The videos may or may not include credibility claims that are then validated. For example, a client can record a video (e.g. for 60 seconds) may include a statement of a new product release, and then include three pre-formatted videos that were professionally created and uploaded about this new product that can be sent to prospects.

Multiple and varied implementations are described herein. Generally, any of the features/functions described with reference to the figures can be implemented using software, hardware, firmware (e.g., fixed logic circuitry), manual processing, or any combination thereof. The terms "module", "tool", and/or "component" as used herein may generally represent software, hardware, firmware, or any combination thereof. For instance, the terms "tool" and "module" can represent software code and/or other types of instructions (e.g. a software application) that can be configured and utilized to perform specified tasks when executed on a computing device or devices.

Generally, the illustrated separation of modules, tools, or components and functionality into distinct units may reflect an actual physical grouping and allocation of such software, firmware, and/or hardware. Alternatively or additionally, this illustrated separation can correspond to a conceptual allocation of different tasks to the software, firmware, and/or hardware. Furthermore, it is to be appreciated and understood that the illustrated modules, tools, and/or components and functionality described herein can be located at a single site (e.g., as implemented by a computing device), or can be distributed over multiple locations (e.g., as implemented over multiple computing devices).

Example Credibility Manifestation

To facilitate the readers' understanding, FIG. 1 illustrates an example credibility cube 100 that may be implemented in accordance with the described techniques. Assume that the credibility cube in this example is illustrated and described in the context of an automated CMS that can be implemented in a credibility framework or system. As such, the credibility owner of the credibility cube 100 may be considered a client of the CMS, and thus may be referred to herein as a client.

As noted above, a credibility cube is one example type of credibility manifestation that may be utilized to represent, manage, validate, and/or convey a credibility owner's credibility profile, and thus credibility, in a convenient and automated manner. As such, in addition to cubes, it is to be appreciated and understood that the techniques described herein are also applicable to other types of manifestations (e.g. other shapes) as well.

In this example, the credibility cube 100 includes six individual sides. Each of the six sides of the credibility cube 100 can be configured and utilized to perform a specific function associated with the client's credibility profile. For example, a personal message side 102 can be configured and utilized to introduce the client to a particular prospect that is intended to be the recipient of the cube. In other words, the side 102 can include a message that has been uniquely created by the client for a particular prospect.

In at least one embodiment, the side 102 can be configured to be the first side of the credibility cube 100 (i.e. the top side of the cube) that the prospect experiences after receiving the cube. In this regard, a message that has been pre-recorded (e.g. with text, sound, images, video and/or one or more other media formats) by the client may be automatically rendered in response to an event, such as the prospect interacting with the credibility cube 100. As an example, the message might automatically play when the prospect clicks or otherwise interacts with the cube, opens an email that includes the cube or a link to the cube, etc.

Here, the credibility cube 100 can also include a profile side 104 that can be configured and utilized to create, manage, and/or represent the client's credibility profile on the cube. For example, the client can be asked one or more questions about their credibility in accordance with credibility coaching services provided by the CMS. The client's responses (i.e. answers) may be recorded on the side 104 as credibility claims along with one or more disclosure statements (i.e. a credibility disclosure(s)).

Alternatively or additionally, the answers and/or disclosure(s) may be recorded on one or more other sides of the cube, such as on one or more of the reference sides described below for instance. In at least one embodiment, a credibility wizard tool can be configured and utilized to help accomplish this, such as by automatically asking the question(s) to the client and/or recording the client's responses for instance.

For purposes of this discussion, a credibility disclosure may be a written and/or recoded statement that a client and particular reference makes regarding the nature of their relationship to one another along with any details likely to be material to a prospect when assessing the client's credibility. In at least one embodiment, the credibility wizard tool can be utilized to automatically interact with the client, and potentially the reference, to facilitate creating and recording the credibility disclosure(s).

In addition to sides 102 and 104, the credibility cube 100 can also include three reference sides 106, 108, and 110. Each such reference side can be configured and utilized to include and/or represent one or more responses by a reference to validate one or more of the credibility claims. Said another way, each of these reference sides can include a reference's response(s) to validate a credibility claim(s) by the client on the cube, and can be utilized to represent the reference response(s) to a prospect. For example, a reference side might be utilized to automatically render the reference response(s) in response to the prospect selecting or otherwise interacting with the reference side.

In at least one embodiment, each of the client's credibility claims can be written and/or recorded on each of these reference sides with the reference response as a validated credibility claim. In other words, each credibility claim and corresponding response can be provided as a validated credibility claim on a reference side of the credibility cube 100.

In at least one embodiment, once reference responses from references has been received, the credibility wizard tool can be utilized to assist the client in determining which received reference responses to include on each of the reference sides 106, 108, and 110. Note that determining which reference responses to include on the reference sides can be considered part of the process of creating and managing the client's credibility profile and credibility cube. To further facilitate this process, and as mentioned above, in at least one embodiment a voice analysis tool can be utilized.

More particularly for example, the voice analysis tool might be utilized to automatically evaluate each received reference response and provide an objective score and/or other type of voice evaluation result for that response. The client may decide to consider the voice evaluations for each reference response when determining which response(s) to include on the sides 106, 108, and 110. The voice analysis results may, or may not, be included on the credibility cube at the client's discretion when the cube is sent to a prospect.

In this regard, recall that a credibility cube can be uniquely configured for a particular prospect or prospects. Therefore, a reference response may be determined to be suitable for one cube for a prospect, but may be determined to not be suitable for another cube to another prospect. As part of managing a client's credibility profile, the CMS can be configured and utilized by the client to add or remove any recording associated with a credibility cube before deploying the cube to a prospect.

Finally, credibility cube 100 can also include a "feedback" side 112 that can be configured and utilized to record feedback from the prospect to the client. This feedback from the prospect can be provided in any suitable format by utilizing any type of media. For example, the prospect may be given the opportunity to record their contact information along with specific types of feedback (e.g. advice, comments, questions, concerns, a survey, etc.) in text, sound video, and/or another media type.

Example Credibility Embodiments

Figure 2:
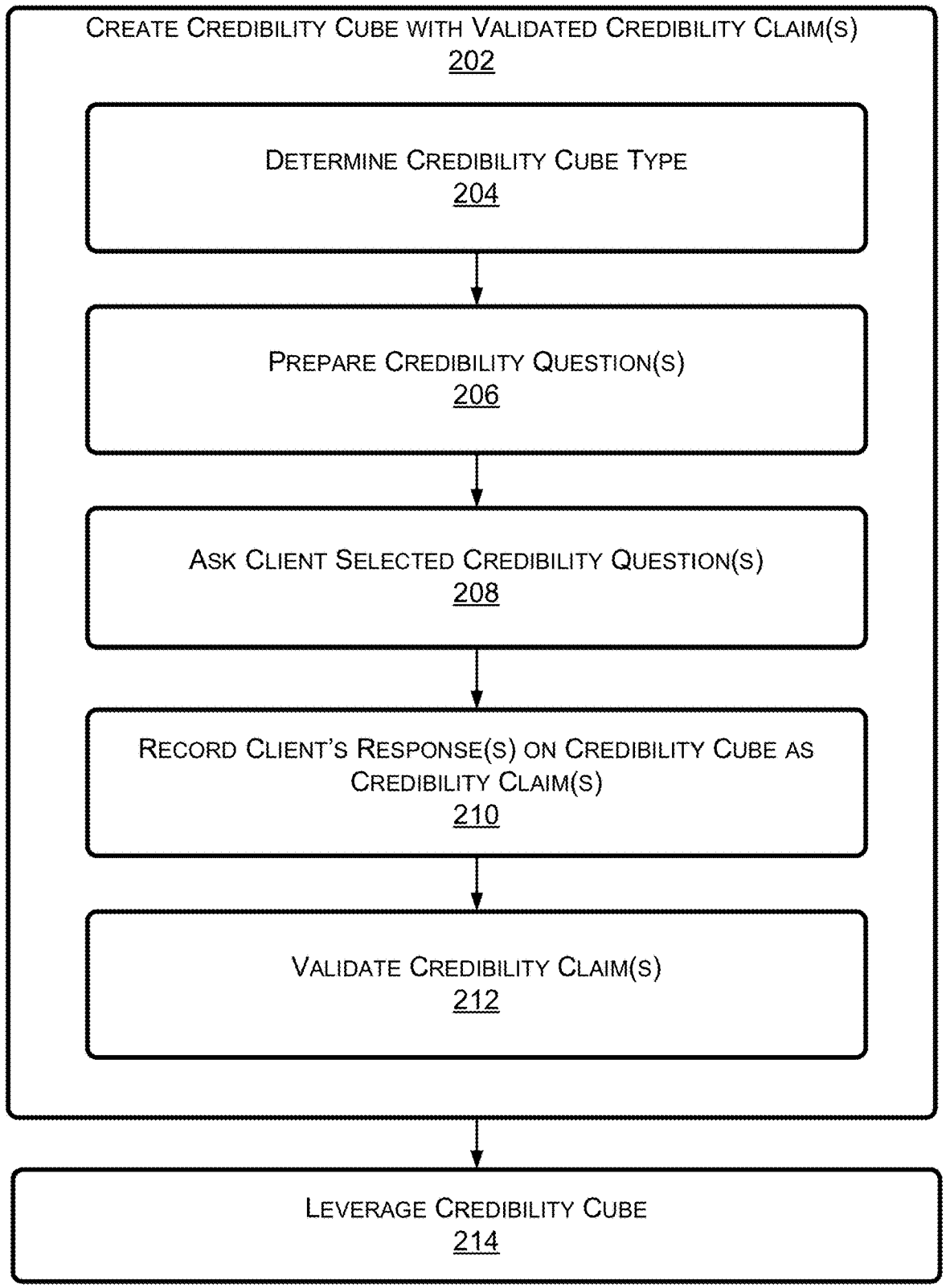
FIG. 2 illustrates a flowchart of an example process, technique, or method that may be implemented, in accordance with at least one embodiment.

FIG. 2 illustrates a flowchart of a process, technique, or method 200 for leveraging a entity's (i.e. client's) credibility that is consistent with at least one implementation of the described credibility techniques. For ease of discussion, the process, technique, or method 200 will be described in the context of an example credibility cube and example automated CMS, such as the credibility cube 100 and CMS described above. However, it is to be appreciated and understood that this process, technique, or method is not necessarily limited to a credibility manifestation that is a cube, or to the CMS described above.

Note that the order in which the blocks of process, technique, or method 200 are described is not intended to be construed as a limitation, and any number of the described blocks or acts can be combined in any order. Furthermore, the process, technique, or method 200 can be implemented in any suitable hardware, software, firmware, or combination thereof such that a computing device can implement the process, technique, or method and/or cause the process, technique, or method to be implemented. In one case, the process, technique, or method 200 can be stored on a computer-readable storage media as a set of computer-readable instructions that, when executed on a computing device, causes all or part of the process, technique, or method 200 to be performed.

Referring to process, technique, or method 200, at block 202 a credibility cube that includes one or more validated credibility claims can be created. As discussed above, the credibility cube can be configured and utilized to represent a client's credibility profile. This allows a prospect to easily assess the client's credibility profile, and thus credibility, by reviewing the validated credibility claims on the credibility cube.

In at least one embodiment, a CMS can be provided to facilitate the client in creating the credibility cube (and possibly other credibility cubes as well). Said another way, the CMS can be configured and utilized to perform at least part of the credibility cube's creation. For example, as discussed above, the client may be provided access to an automated credibility wizard tool, and/or other tools (e.g. voice validation tool and/or interactive media tool) that can be utilized to create the credibility cube.

In operation, any suitable process, technique, or method can be utilized to create the credibility cube. For example, as described above, a client might create and utilize any number and type of credibility cubes. As such, here at block 204 the type of credibility cube to be created can be determined. This can be accomplished in any suitable way. For example, a credibility coach that is a person might walk the client through the process of selecting the type of credibility cube to be created. Alternatively or additionally, the credibility wizard tool described above might be utilized to provide credibility coaching by walking the client through some or all of this process.

Figure 3:
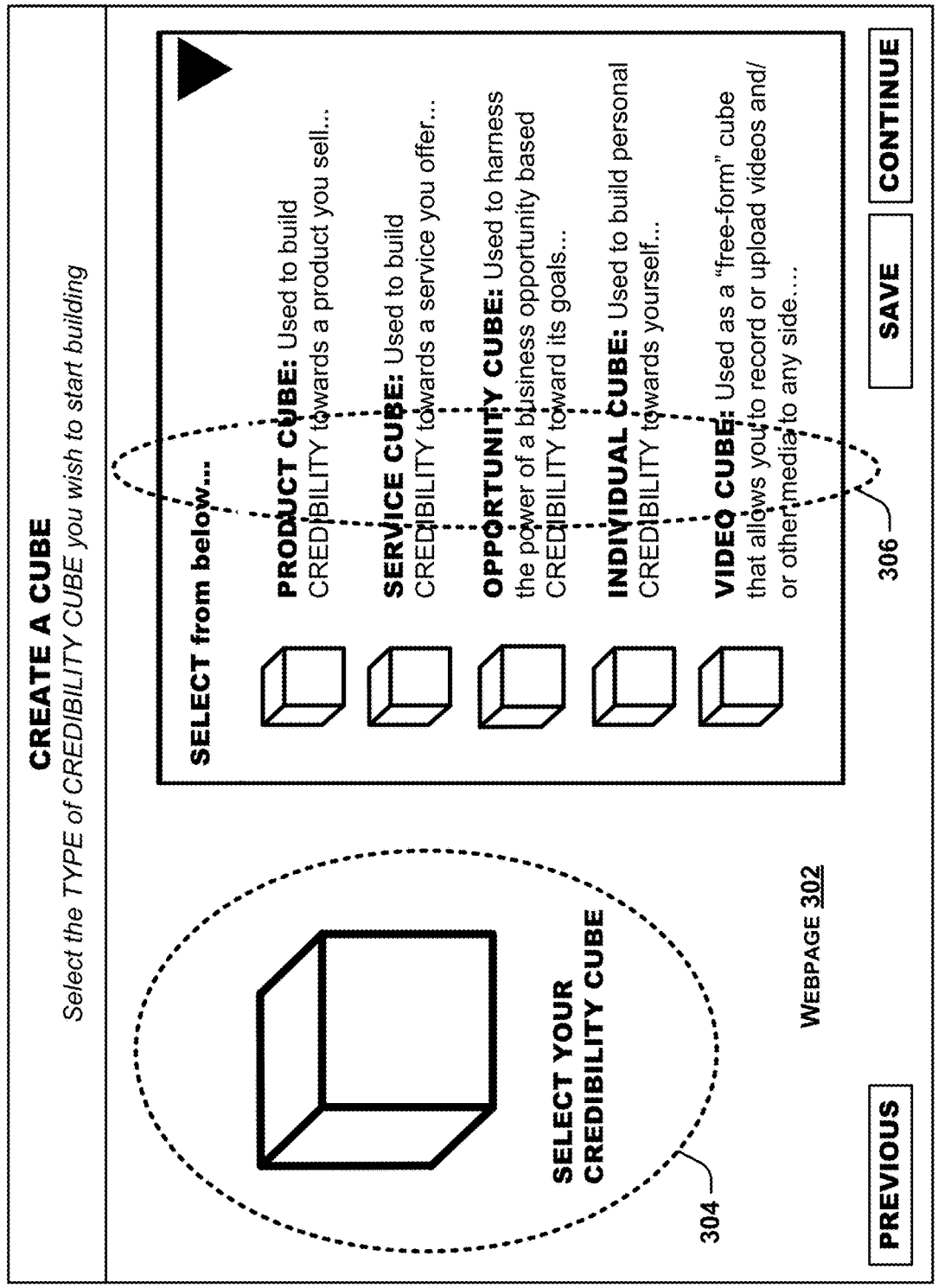

To provide the reader with a practical example, FIG. 3 and the accompanying discussion illustrates and describes a screenshot 300 from an example webpage 302 that includes CMS functionality for walking a client through the process of selecting a credibility cube type.

Referring to FIG. 3, note that the example webpage 302 includes certain credibility coaching functions to assist the client in selecting a credibility cube type. More particularly, here the webpage 302 includes a general indication of the webpage's function 304 along with a credibility cube creation type selection control 306 in the form of a drop-down box that is configured to display available cube types for the client to select.

Note that here, each listed credibility cube type includes a description of that cube. In this example, assume that the displayed portion of the description of a particular cube can be further expanded when the client hovers over or otherwise interacts with the displayed portion.

Once the credibility cube type to be created is determined at block 204, at block 206 one or more credibility questions can be prepared. The preparation of the credibility question(s) at block 206 can be accomplished in any suitable way. For example, a person might walk the client through the process of creating credibility questions and/or selecting and optionally customizing one or more proposed draft credibility questions. Alternatively or additionally, the credibility wizard tool might be configured to provide credibility coaching by walking the client through some or all of this process.

With respect to proposed draft credibility questions, in at least one embodiment, one or more draft credibility questions can be strategically proposed by the CMS (e.g. via the credibility coaching wizard) to elicit a response by the client that can represent, manage, demonstrate, and/or convey the client's credibility to one or more specific prospects in a manner that is beneficial to the client. The draft credibility question(s) can then optionally be customized (i.e. modified) for a particular client, prospect, product, service, individual, etc. For example, a draft credibility question may be modified to refer to a particular product or service associated with a prospect.

To provide the reader with a practical example, FIG. 4 and the accompanying discussion illustrates and describes a screenshot 400 from an example webpage 402 that includes CMS functionality for walking a client through the process of preparing credibility questions by selecting draft credibility questions. For purposes of discussion, assume here that the client is a company named A1 and that A1 created a service credibility cube.

Referring to FIG. 4, in this example screenshot 400 includes a webpage 402 with certain credibility wizard tool functions associated with assisting the client in preparing and ordering multiple credibility questions. More particularly, note that the webpage 402 includes a credibility cube selection control 404 in the form of both a search window and drop-down box to facilitate a user (e.g. the client) searching for, identifying, and selecting a particular credibility cube. As shown in the drop-box portion of the credibility cube selection control 306, in this example the client A1 has selected a service cube.

The webpage 402 also includes a credibility question display 406 that can list individual proposed draft credibility questions associated with the credibility cube selected via the credibility cube selection control 404. For example, here several proposed draft credibility questions associated with the selected service cube type (and thus service cube) are listed sequentially and numbered (i.e. 1 through 5). To assist the client and/or another (e.g. a credibility coach) in reordering and/or customizing (e.g. editing) each of the individual proposed draft credibility questions, the credibility question display 406 includes a question sorting control 408 and editing function 410 to allow selected draft credibility questions to be modified.

Referring again to FIG. 2, once the credibility question(s) have been prepared at block 206, at block 208 the client can be asked each of the one or more selected credibility questions. In at least one embodiment, the CMS can be configured and utilized to automatically perform some or all of block 208 by providing credibility coaching services. For example, the credibility wizard tool might be configured and utilized to automatically provide (e.g. present and/or playback) an explanation to the client as to why each selected credibility question is important, provide sample answers to assist the client in creating their own answer, and/or offer suggestions.

In at least one embodiment for example, each selected credibility question can be associated with a credibility management and/or sales system (CMSS) methodology. The CMSS methodology can be designed to describe the selected question's use and area of credibility, feature, and/or provide a description for the client and reference as to why the selected question is important. For example, an explanation can be provided as to why a particular selected question may represent, demonstrate, and/or convey the client's character, credentials, competence, and/or consistency.

The CMSS methodology can also be designed to provide suggestions to the client regarding their response. This methodology can be dynamically based on the question selected, and or created via credibility coaching. In at least one embodiment, the credibility wizard tool can be configured to utilize the CMSS methodology as part of the credibility coaching provided via the CMS.

To provide the reader with a practical example, FIG. 5 and the accompanying discussion illustrates and describes a screenshot 500 from an example webpage 502 that includes CMS functionality for asking the client the credibility questions that were prepared at block 206.

Referring to screenshot 500, here on the webpage 502 a credibility question 504 is being asked to the client, A1. A1 can then type their initial response (i.e. initial answer to the question) in an answer text box 506 on webpage 502. As noted above and explained below, the credibility question and A1's typed response can then be utilized to record a final credibility response (recorded response).

In addition, as part of the credibility wizard tool, here webpage 502 also includes credibility coaching in the form of presenting an explanation 508 to the client about the question 504, such as an explanation as to why the credibility question 504 is important. By understanding the reason for the question, A1 can provide an answer as part of its credibility statement that is more relevant to, and that more beneficially conveys, A1's credibility.

Finally, to help track the progress of creating such a cube(s), here in this example webpage 502 also includes presenting a credibility profile progress update 510 to inform the client of the progress that has been made (e.g. the client's credibility profile is 14% complete).

While here in this example credibility coaching is provided as part of the automated credibility wizard tool of the CMS, any type of credibility coaching can alternatively or additionally be provided in person by a credibility coach and/or in some other suitable way (e.g. via phone, remote conferencing, written correspondence, etc.).

Note that in this example, A1 is a client that provides services. In this regard, A1 is receiving credibility coaching via a credibility wizard tool to help create and/or update a credibility profile on one or more service credibility cubes. Without limitation, other credibility coaching that might be provided to A1 as part of this process might include asking A1 why one or more of its particular products and/or services is unique and/or superior to other products, why A1's customer service is superior, and/or about A1's customers' loyalty.

As another example, consider another type of entity, such as an individual wishing to apply to a school or for a job (i.e. an applicant). Such an applicant might receive credibility coaching as a client via the CMS to help them create and/or update a credibility profile on one or more individual credibility cubes. For example, the applicant might be asked credibility questions about why they are unique and a superior candidate. For instance, the applicant might be asked to describe certain key personal qualities, such as their perseverance, attitude, dedication, credentials, and/or past achievements and accolades.

Referring back to FIG. 2, at block 210 each of the client's responses to each credibility question can be recorded on the credibility cube as a credibility claim. In at least one embodiment, one or more initial responses by the client can first be typed and/or recorded on video by the client. The initial typed and/or recorded response(s) can then be reviewed and modified (if necessary) to create a final response to be recorded (i.e. the recorded response). One example of an answer text box configured to allow a client to type their response to a particular question is shown as answer text box 506 on webpage 502.

In at least one embodiment, the CMS can be configured and utilized to automatically perform some or all of block 210 by providing credibility coaching services. For example, the credibility wizard tool, interactive tool, and/or voice analysis tool might be configured and utilized to automatically provide coaching services (e.g. analysis, feedback, and recording assistance) regarding the initial typed and/or recorded response(s), and/or the recorded response. Without limitation, feedback can include suggestions or recommendations regarding how to modify and retype and/or re-record one or more initial responses. Recording assistance can include, for instance, providing a media recording and voice analysis functionality to record an initial response and/or the final response.

More particularly for example, the credibility wizard tool might provide spelling and other grammatical corrections, limit the number of characters in the typed response to help ensure that the response is concise and relevant, and/or provide an explanation as to why a selected credibility question is important. The voice analysis tool, in turn, might provide analysis and feedback to the client about voice characteristics associated with an initial recorded response and/or the recorded response. This feedback might be include recommendations about re-recording the initial response (e.g. speak slower) for instance.

Finally, in addition to providing a way to record the initial response and/or final response, the interactive media tool might also limit the length of the recording, adjust or control the brightness and/or other visual and/or sound characteristics of the video, etc.

Note that although the final credibility response is referred to herein by using the term "final", this is not to be interpreted as meaning that this response cannot be changed and/or replaced at any time. For example, the client may wish to re-record their final credibility response after receiving feedback from a reference, the credibility wizard tool, and/or after subsequent events have occurred for instance.

As another example of credibility coaching services that can be provided by the CMS, the CMS might apply an expiration date to a particular credibility cube. As described below in further detail, such an expiration date may be referred to herein as a reference response relevance expiration date (RRRED). For example, after six (6) months, a reference response might be considered outdated and no longer relevant, and thus not persuasive, with respect to a client's credibility. As such, the CMS might be configured and utilized to maintain and ensure the relevance of validated credibility claims on a credibility cube.

Figure 6:
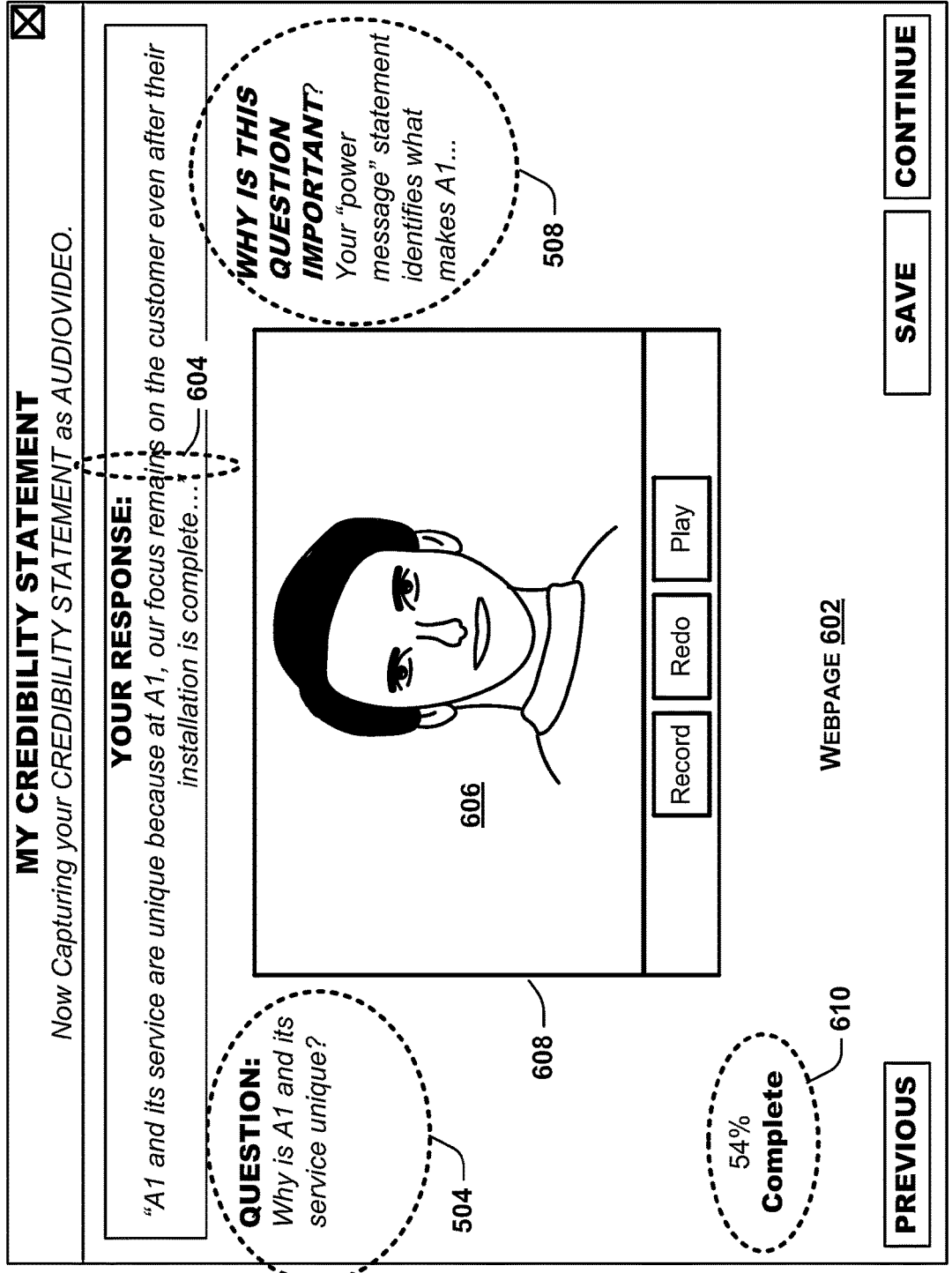

To provide the reader with a practical example how a credibility wizard tool, voice analysis tool, and/or interactive media tool might facilitate the client in recording their final response, FIG. 6 and the accompanying discussion of FIG. 6 illustrates and describes a screenshot 600. Note that the screenshot 600 is from an example webpage 602 that is associated with the CMS being provided to A1.

Referring to FIG. 6, in this example A1 has now provided the client's typed credibility response 604 to the credibility question 504 described above. For purposes of discussion, assume that the typed credibility response 604 was provided by A1 via the answer text box 506 on webpage 502. Note that the credibility question 504 and the explanation 508 are presented on the webpage 602 to assist A1 in recording their final credibility response 606.

Also note that here, an interactive media tool 608 is provided to assist the client in recording the final credibility response 606. Finally, to help track the progress of creating such a cube(s), webpage 602 also includes a credibility profile progress update 610 to inform the client of the progress that has been made (e.g. the client's credibility profile is now 54% complete).

Referring again to FIG. 2, once the client's recorded response(s) 606 (i.e. final. response(s)) has been recorded on the credibility cube as a credibility claim(s), at block 212 each credibility claim can be validated by one or more references. This can be accomplished in any suitable way. For example, in accordance with at least one embodiment, the process, technique, or method 700 illustrated in FIG. 7 and described below can be utilized to accomplish block 212.

Figure 7:
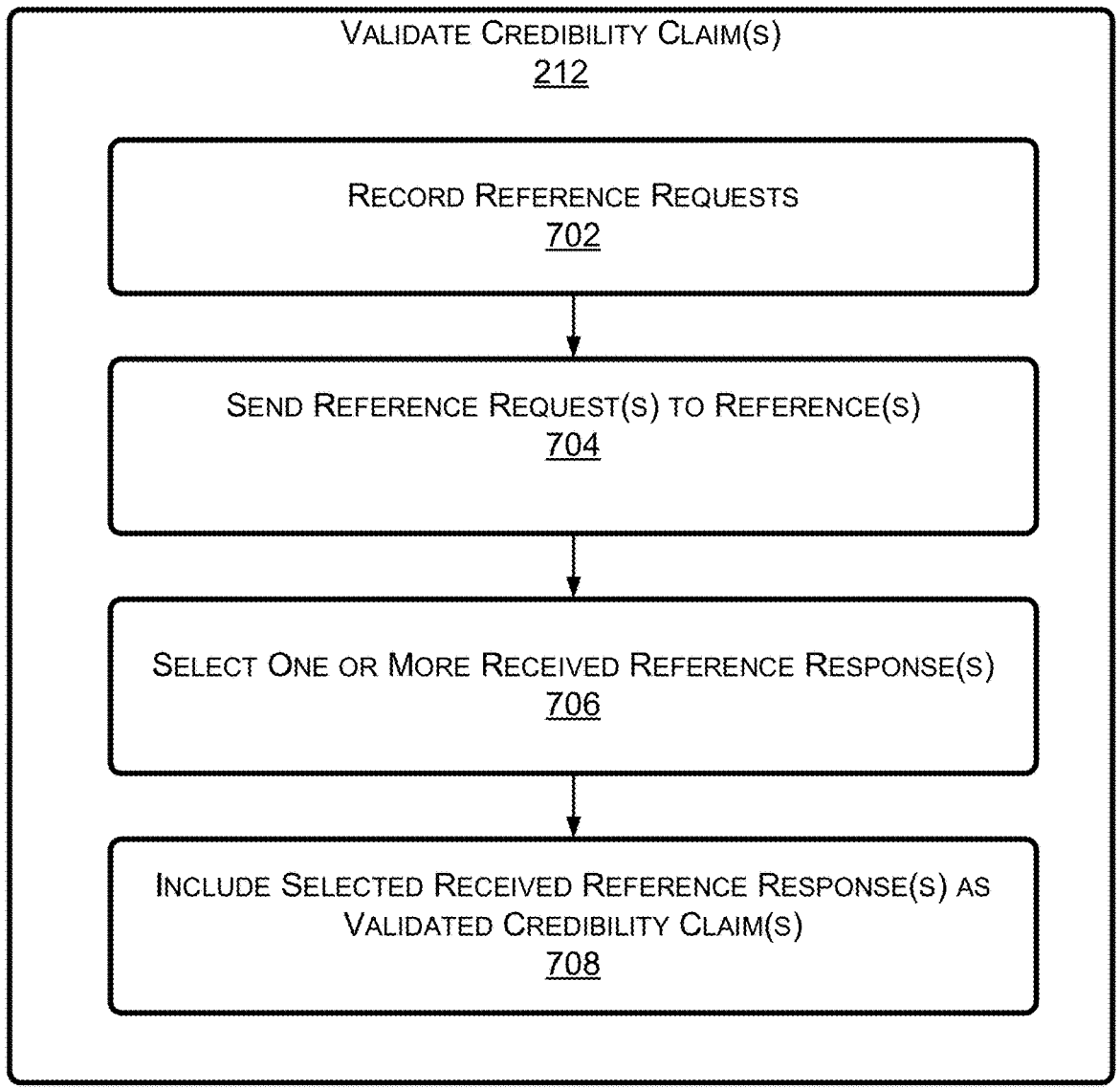
FIG. 7 illustrates a flowchart of an example process, technique, or method that may be implemented, in accordance with at least one embodiment.

Referring now to FIG. 7, at block 702 requests to one or more references can be recorded. For purposes of discussion, such a request may be referred to herein as a reference request. As explained above, each recorded reference request may serve as a way for the client to ask a particular identified reference to independently validate (i.e. substantiate) one or more of the client's credibility claims by recording a response to each such claim. In other words, each recorded reference request can be a personalized message from the client that serves as an appeal by the client to a reference to substantiate the client's credibility claim(s). As such, each such reference request may also be referred to herein as a personalized reference request.

To allow for control of the format and/or other characteristics of each reference's response(s), in at least one embodiment the credibility cube and/or CMS can be configured to not accept reference responses that are not recorded via functionality of the credibility cube. In other words, in such an embodiment, a reference would need to record their response by using an interactive media tool (e.g. interactive media tool 608) or other functionality provided by the credibility cube and/or CMS rather than being permitted to simply send their own written or recorded response back to the client.

The client's reference requests can be recorded at block 702 in any suitable way. For example, a person might walk the client through the process of identifying each reference and then recording each request to each identified reference. Alternatively or additionally, the credibility wizard tool described above might be configured to provide credibility coaching by walking the client through this process.

Figure 8:
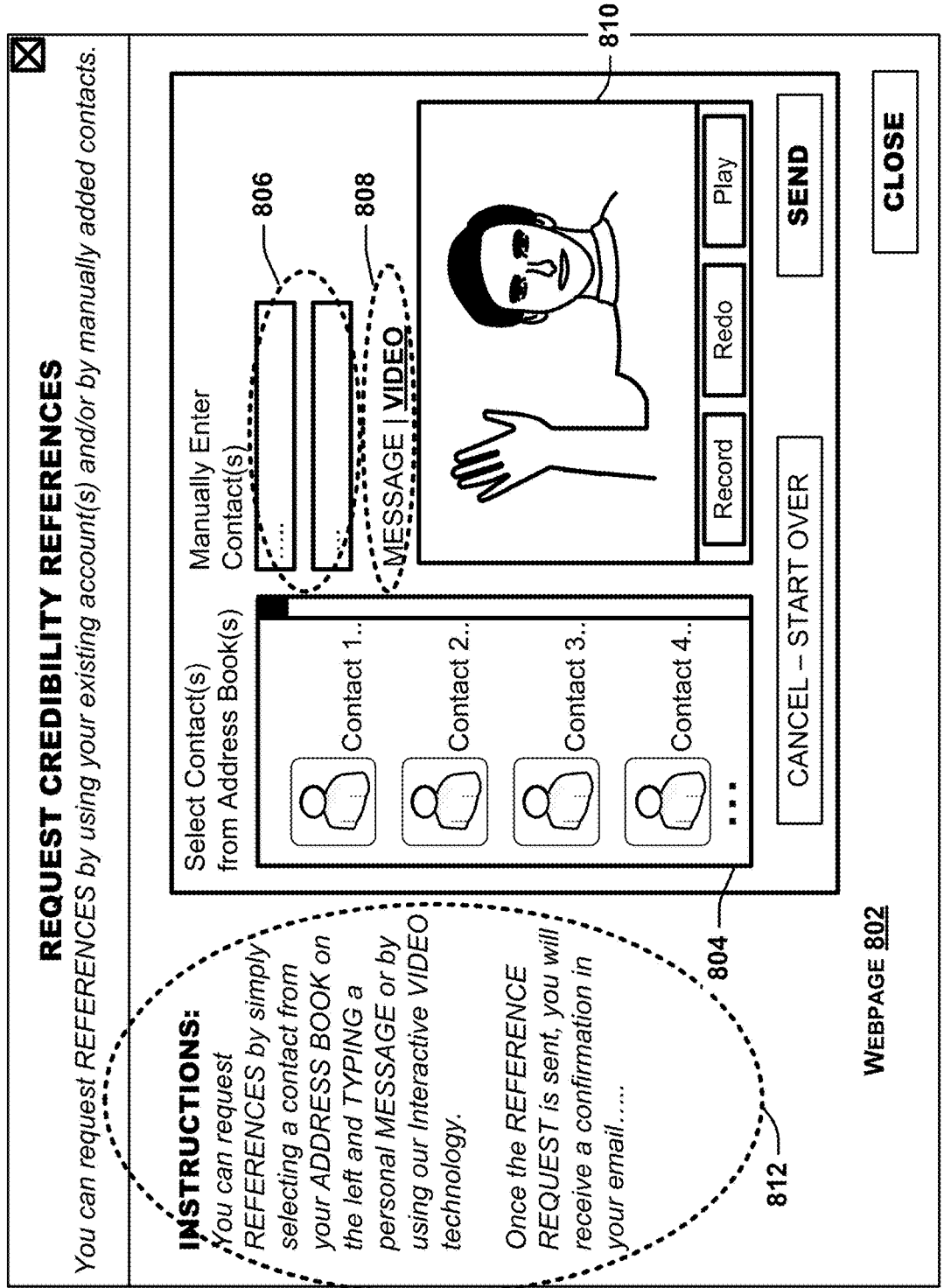
FIG. 8 illustrates a screenshot from example webpage, in accordance with at least one embodiment.

To provide the reader with a practical example, FIG. 8 and the accompanying discussion illustrates and describes a screenshot 800 from an example webpage 802 that includes CMS functionality for, among other things, walking the client A1 through the process of recording one or more personalized reference requests by utilizing the interactive media tool, in accordance with at least one embodiment.

Referring to FIG. 8, note that webpage 802 includes a reference selection tool 804 for the client A1 to select one or more references from one or more address books, and a manual reference input tool 806 for A1 to manually type in one or more references. Here the webpage 802 also includes a reference message toggle tool 808 for A1 to choose the type of reference request message to be sent to the reference(s) added via the reference selection tool 804 and/or manual reference input tool 806.

Each such message can introduce the client to the selected reference(s) and request that the selected reference(s) validate each of A1's credibility claims by recording and sending a corresponding response to each claim. More particularly, in this example the reference request message toggle tool 808 allows A1 to select between recording a typed reference request (i.e. "Message") or a video reference request (i.e. "Video"). Once recorded, one or both of the recorded message and video can then be sent to the selected reference(s).

To assist the client in recording a personal reference request, the webpage 802 also includes an interactive media tool 810. In at least one embodiment, the interactive media tool 810 is similar to, or the same as, the interactive media tool 608. In operation, the interactive media tool 810 might be utilized by the client to record, review, and optionally edit and/or re-record the reference request. Finally, note that in this example, credibility coaching can be provided to A1 in the form of an explanation message and/or instructions 812 that are intended to assist A1 in utilizing functionality provided via the webpage 802.

Referring back to FIG. 7, once recorded at block 702, at block 704 the client's reference requests can be sent (e.g. either alone or as part of the credibility cube) to the selected reference(s) by any suitable means, such as electronically by electronic mail (i.e. email) for instance. The client can then wait for one or more reference responses to be returned back to the client and/or CMS. Said another way, the client's reference request can be sent to the selected reference(s) in any suitable format in any manner that conveys to the reference(s) that the client and/or CMS would like the reference(s) to respond to the reference request.

For example, a selected reference may be asked to actively indicate whether or not they accept the received reference request by selecting or otherwise engaging an online selection tool in the body of a received email, by selecting or otherwise engaging a link (e.g. universal resource locator or URL) to the CMS, and/or by simply replying to the reference request (e.g. replying to the emailed reference request).

Alternatively or additionally, the reference may be asked to select or otherwise engage a link to a webpage provided by the client and/or CMS before indicating whether or not they want to provide a reference response. By engaging the link, the reference may be automatically sent to (e.g. navigated to via their browser) or otherwise presented with a recorded message from the client and/or CMS that introduces the client and/or elaborates about the reference request.

Continuing, after some or all of the reference requests sent at block 704 have been received back from the reference(s) as reference responses, at block 706 one or more of the received reference responses can be selected to validate the client's credibility claim(s) on the credibility cube. Once selected at block 706, at block 708 the selected received reference response(s) can be included with the client's credibility claim(s) on the credibility cube as the validated credibility claim(s).

This can be accomplished in any suitable way. For example, a credibility coach that is a person may walk the client through the process of selecting the received reference responses to include with the credibility claim(s). Alternatively or additionally, the credibility wizard tool described above can be configured to provide credibility coaching by walking the client through this process of selection.

To ensure that each received reference response received and/or included on the credibility cube remains relevant, in at least one embodiment an RRRED can be attributed to each such response. An RRRED for a received response can be defined and determined by a pre-defined amount of time (i.e. relevance time limit) after that response was recorded by the reference or received back from the reference. Any relevance time limit can be utilized in order to define and determine an RRRED for a particular reference response.

For example, if a relevance time limit for a received reference response is defined as six (6) months, then that received response can be considered to be expired after six (6) months from being recorded or received. The date that the received response expired, or will expire, can be considered that response's relevancy expiration date.

By attributing a relevance expiration date to a received reference response to define and determine an RRRED, a prospect and/or other entity can be reasonably assured that that reference response is still applicable and relevant to the client and the credibility claim that that reference response validates. Said another way, an RRRED for a reference response can be utilized by the prospect to ensure that that response still reasonably represents the reference's opinions and feedback with respect to the client and the client's credibility claim(s).

Figure 9:
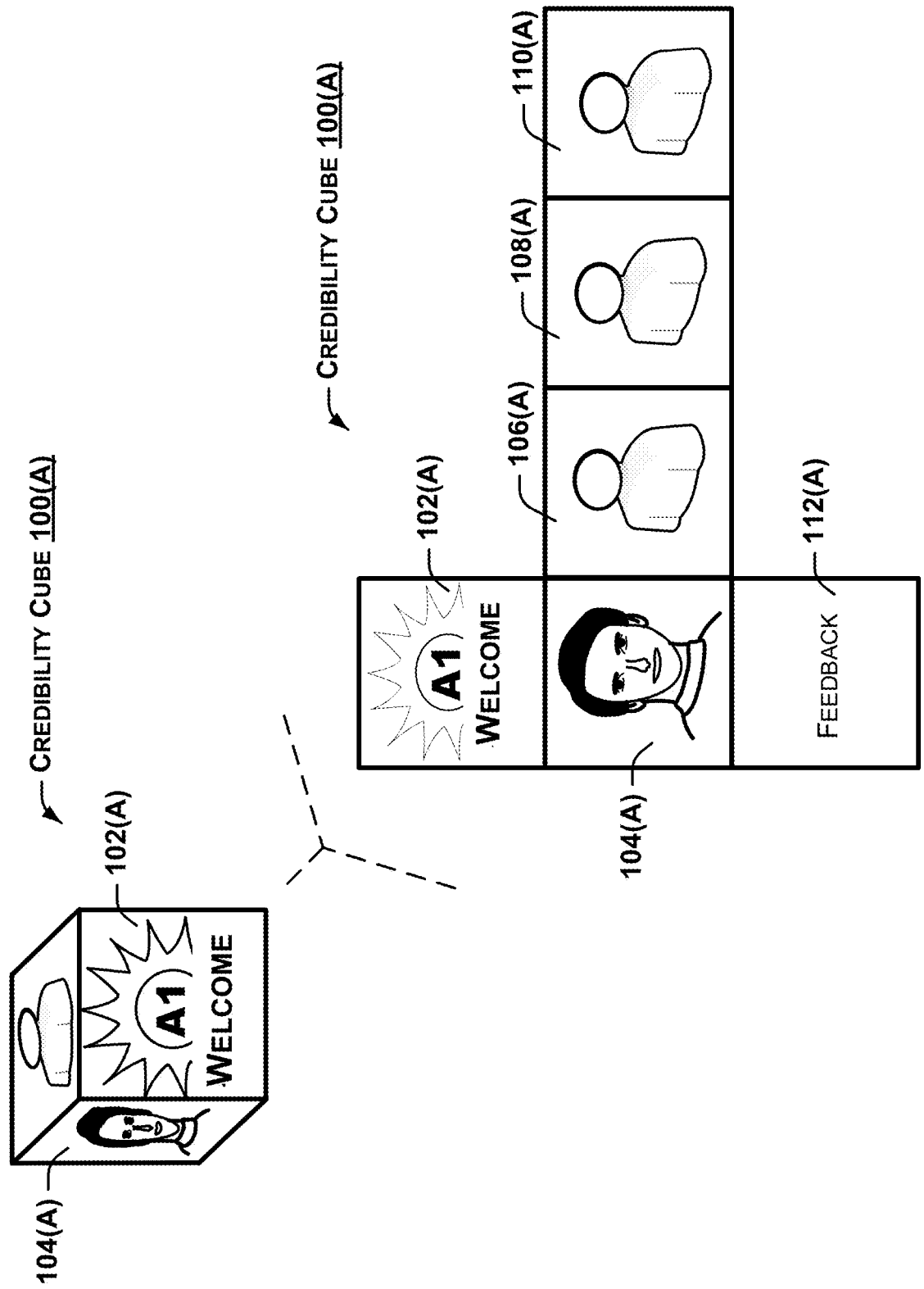
FIG. 9 illustrates an example credibility cube implementation, in accordance with at least one embodiment.

To provide the reader with a practical example of how such a completed credibility cube for the client A1 might appear after a "profile" side, "personal message" side, and three "reference" sides have been recorded (e.g. by utilizing a credibility wizard tool), FIG. 9 illustrates an example implementation of the credibility cube 100 as credibility cube 100(A).

Referring to FIG. 9, note that the credibility cube 100(A) has six individual sides. More particularly, here the credibility cube 100(A) includes a personal message side 102(A) that can introduce A1 to a prospect that receives the cube (e.g. via email). Note that in at least one embodiment, the credibility wizard tool and/or other functionality associated with the CMS can be configured to facilitate the client recording (e.g. on video) and/or otherwise preparing an introductory message about the client to include on side 102(A).

Here, credibility cube 100(A) also includes a profile side 104(A) that can be utilized to create and manage the entity's credibility profile on the cube. Here, and as illustrated and described above, the client has included their recorded credibility statement(s) recorded via the credibility wizard tool and/or other functionality associated with the CMS.

In addition to the sides 102(A) and 104(A), here the credibility cube 100(A) also includes three reference sides 106(A), 108(A), and 110(A). Each reference side can include one or more validated credibility claims that, as explained above, include a selected reference response(s) for a credibility claim of A1.

Referring back to FIG. 2, once the credibility cube with the validated credibility claim(s) has been created at block 202 (i.e. at blocks 204, 206, 208, 210, and 212), at block 214 the credibility cube can be leveraged. For example, as explained above, the credibility cube can be sent electronically (e.g. via email) by the client to one or more prospects. In at least one embodiment, a CMS can be provided to facilitate the client leveraging the credibility cube (and possibly other credibility cubes as well). Said another way, the CMS can be configured and utilized to perform at least part of leveraging the credibility cube. For example, the client may be provided access to CMS functionality that can be used to help identify prospects, electronically send and track credibility cubes to the prospects, and receive and track feedback from prospects.

As explained above, the credibility cube can be configured to convey the client's credibility profile, and thus credibility, to the prospect by allowing the prospect to experience (e.g. view, asses, etc.) the cube's various sides, or content. More particularly, each prospect that receives the credibility cube (e.g. that has been sent to the prospect electronically) can thus access the cube, experience the cube's content, and utilize that content to evaluate the client's credibility. In this way, the client's credibility profile, and thus credibility, can be conveyed to the prospect.

For example, a prospect may review and assess the personal message, validated credibility claims, and other content on the various sides of the cube in order to form an opinion about the client's credibility. To accomplish this, the prospect might access the credibility cube, for example, via a web browser or other functionality on a computing device (e.g. mobile device, desktop computer, tablet device, phone, etc.).

Example Embodiment

Reference's Perspective

Figure 10:
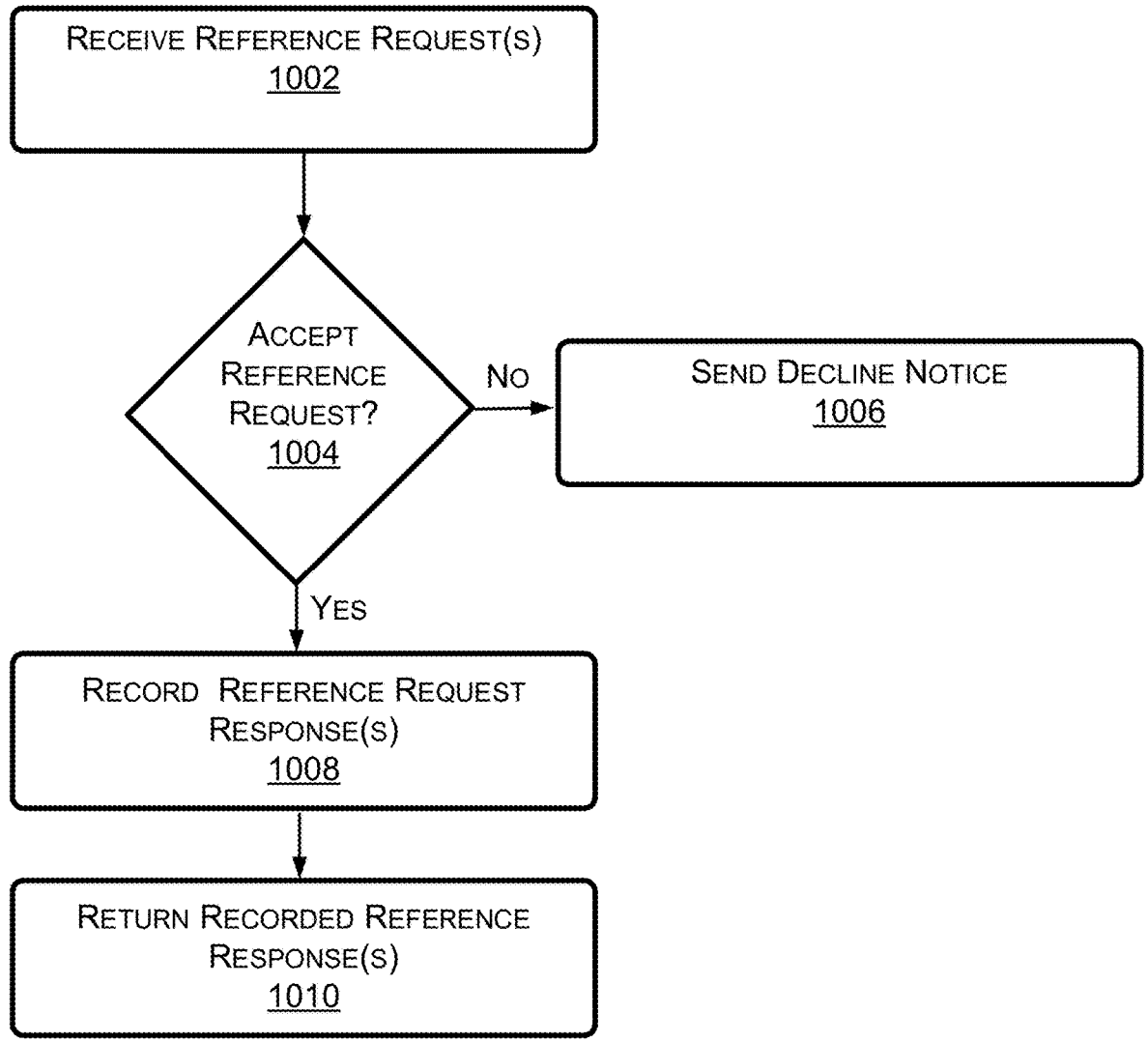
FIGS. 10 and 11 each illustrate a flowchart of an example process, technique, or method that may be implemented, in accordance with at least one embodiment.

To provide the reader with a practical example from the perspective of a reference, FIG. 10 and the accompanying discussion illustrates and describes an example process, technique, or method 1000 that may be implemented in accordance with the described techniques. Note that the order in which the blocks of process, technique, or method 1000 are described is not intended to be construed as a limitation, and any number of the described blocks or acts can be combined in any order.

Furthermore, the process, technique, or method 1000 can be implemented in any suitable hardware, software, firmware, or combination thereof such that a computing device can implement the process, technique, or method and/or cause the process, technique, or method to be implemented. In one case, some or all of the process, technique, or method 1000 can be stored on a computer-readable storage media as a set of computer-readable instructions that, when executed on a computing device, causes all or part of the process, technique, or method 1000 to be performed.

For ease of discussion, the process, technique, or method 1000 will be described in the context of an example credibility cube and example automated CMS, such as the credibility cube 100 and CMS described above. However, it is to be appreciated and understood that this process, technique, or method is not necessarily limited to a credibility manifestation that is a cube or to the CMS described above.

Referring to the process, technique, or method 1000, at block 1002 a reference may receive a credibility reference request. A reference can be anyone that has a relationship to the client that requests validation of one or more credibility claims. This could be for a person, product, service, or opportunity. As explained above, the credibility reference request can be utilized as a way for a client, who is the credibility owner, to ask the reference to independently validate one or more of the client's credibility claims recorded on the credibility cube. Once independently validated by the reference, the credibility claims can be provided via the credibility cube to one or more prospects as validated credibility claims.

In operation, the credibility request can be received by the reference in any suitable way. For example, in at least one embodiment, the reference might receive an email electronically from a client of the CMS and/or from the CMS. The reference might then access the content of the email, for example, via a web browser or other functionality on a computing device (e.g. mobile device, desktop computer, tablet device, phone, etc.).

As explained above, a reference request can be provided (i.e. sent) to a reference in any suitable format in any manner that conveys to the reference that the client and/or CMS would like the reference to respond to the reference request.

For example, in this example the reference may be asked to actively indicate of whether or not they accept the received reference request by selecting or otherwise interacting with an online selection tool in the body of a received email, by selecting or otherwise engaging a link (e.g. to a webpage of the CMS), and/or by simply replying to the request. Alternatively or additionally, the reference may be asked to select or otherwise engage a link to a webpage provided by the client and/or CMS before indicating whether or not they want to provide a reference response Once the reference request is received at block 1002, at block 1004 a determination can be made whether or not the reference accepts the received reference request. In other words, a determination can be made as to whether or not the reference wishes to independently validate one or more of the client's credibility claims by providing one or more reference responses.

This determination can be accomplished in any suitable way. For example, the reference may actively indicate whether they wish accept the request by selecting or otherwise engaging an online selection tool and/or link, and/or by replying to the request. As another example, the reference may passively indicate that they do not accept the request by ignoring the request.

If at block 1004 it is determined that the reference does not accept the reference request (i.e. does not want to provide a response) (i.e. "No"), at block 1006 a decline notice can be sent to the client and/or CMS. The decline notice might be provided (e.g. sent to the credibility owner and/or CMS) automatically in response to the reference's active indication and/or passive indication. For example, the CMS might be configured to send a decline notice to the client when a response from the reference has not been received after a pre-defined time period following the request.

If, however, at block 1004 it is determined that the reference does accept the reference request (i.e. does want to provide a response) (i.e. "Yes"), at block 1008 a response can be recorded for each credibility claim. In other words, the reference can record their response(s) in response to the reference request. This can be accomplished in any suitable way. For example, in at least one embodiment, the reference can be sent to, or presented with, (e.g. via the reference's browser) a reference webpage and/or reference functionality (e.g. application) of the CMS.

After being sent to, or presented with, the reference webpage, a recorded reference request message can then be rendered or otherwise presented to the reference on the reference webpage introducing the client and providing an explanation about the reference request. The client's recorded credibility claim(s) might be included as part of the reference request message or, alternatively, provided separately from the reference request message. In at least one embodiment, an interactive media tool similar to or the same as the interactive media tools 608 and/or 810 might be utilized via the reference webpage to render the reference request message and/or credibility claim(s) for the reference.

Recall that the CMS may have provided the client with credibility coaching and functionality (e.g. via a credibility wizard tool) to assist the client in recording credibility claim(s) and/or the reference request message. For example, in the example embodiments described above, the client A1 was provided with various tools, including the interactive media tools 608 and 810, to assist the client in recording final responses to selected credibility questions as credibility claims and reference requests.

After experiencing the recorded credibility claim(s) and reference request message (together or separately), the reference can then record their response(s) to each credibility claim. In at least one embodiment, the reference functionality on the reference webpage of the CMS may be utilized by the reference to record each response. For example, the above-mentioned interactive media tools may be utilized by the reference to accomplish this.

Once the reference request response(s) has been recorded at block 1008, at block 1010 the recorded reference response(s) can be returned (e.g. sent back) to the client and/or CMS. This can be accomplished in any suitable way.

For example, in an embodiment where the reference is sent to, or presented with, a reference webpage, the reference might be asked to submit their recorded reference response(s) via functionality (e.g. a "submit" control) on the webpage. The submitted reference request(s) can then be automatically sent to the client and/or CMS. Alternatively or additionally, each recorded reference might be automatically submitted and sent to the client after being recorded.

As another example, the reference might be asked to email or otherwise send the recorded reference request(s) back to the client and/or CMS. In such an example, the reference might have recorded the reference request(s) via the credibility cube and/or other functionality provided on a computing device (e.g. mobile device, desktop computer, tablet device, phone, etc.).

Example Embodiment

Prospect Perspective

Figure 11:
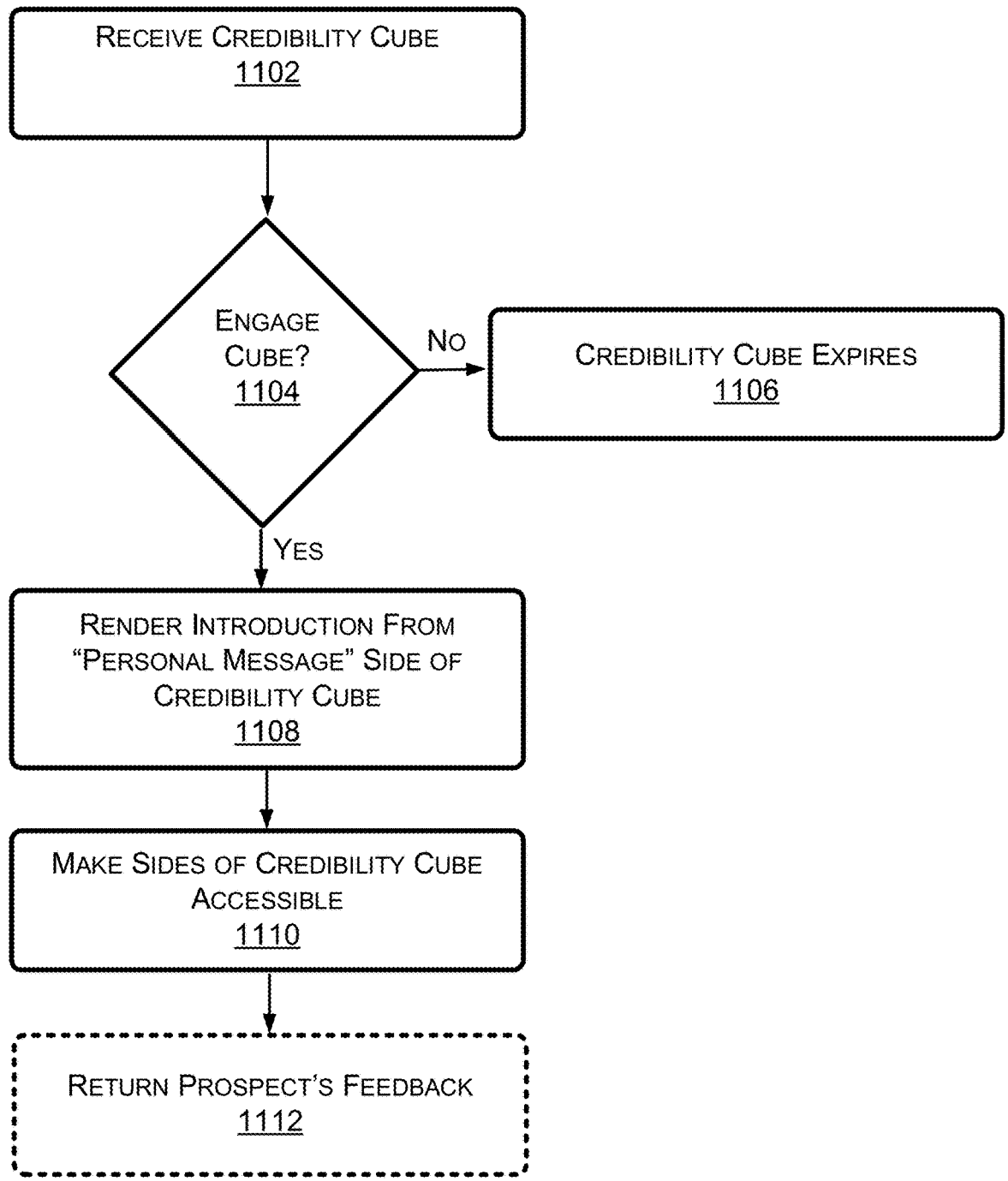

To provide the reader with a practical example from the perspective of a prospect, FIG. 11 and the accompanying discussion illustrates and describes an example process, technique, or method 1100 that may be implemented in accordance with the described techniques. Note that the order in which the blocks of process, technique, or method 1100 are described is not intended to be construed as a limitation, and any number of the described blocks or acts can be combined in any order.

Furthermore, the process, technique, or method 1100 can be implemented in any suitable hardware, software, firmware, or combination thereof such that a computing device can implement the process, technique, or method and/or cause the process, technique, or method to be implemented. In one case, some or all of the process, technique, or method 1100 can be stored on a computer-readable storage media as a set of computer-readable instructions that, when executed on a computing device, causes all or part of the process, technique, or method 1100 to be performed.

For ease of discussion, the process, technique, or method 1100 will be described in the context of an example credibility cube and example automated CMS, such as the credibility cube 100 and CMS described above. However, it is to be appreciated and understood that this process, technique, or method is not necessarily limited to a credibility manifestation that is a cube or to the CMS described above.

Referring to the process, technique, or method 1100, at block 1102 a prospect may receive a credibility cube. As explained above, the credibility cube might have been sent by or for (i.e. on behalf of) a client by the CMS. In other words, the prospect may have received the credibility from the client and/or the CMS.

A prospect can be any person or other type of entity that a credibility owner wishes to convey their credibility profile to. For example, a prospect might be a potential employer, employee, client or customer, patient, prospect or candidate, etc.

As explained above, a credibility cube can be provided (i.e. sent) to a prospect by the client and/or CMS in any suitable way, such as electronically. For example, the prospect might receive an email that, when opened, automatically renders or otherwise presents contents that include a depiction of the credibility cube, a message about the credibility cube, and/or a link (e.g. URL) that can be selected or otherwise engaged by the prospect.

Once the credibility cube is received at block 1102, at block 1104 a determination can be made by the prospect whether or not the prospect wishes to engage the credibility cube. In other words, a determination can be made as to whether or not the prospect wishes to further interact with the email's contents to access the credibility cube. In at least one embodiment, this determination can be based on whether or not the prospect selects or otherwise interacts with the email's contents.

If at block 1104 it is determined that the prospect does not wish to engage the credibility cube (e.g. the prospect does not interact with the email's contents) (i.e. "No"), at block 1106 the credibility cube can expire after a pre-determined amount of time following the credibility being sent to, or received by, the prospect (e.g. measured in weeks, days, hours, etc.). For example, the target webpage of a link to the credibility cube in the email may be inactivated and removed (i.e. expire) after the pre-determined amount of time has occurred.

If, however, at block 1104 it is determined that the prospect does wish to engage the credibility cube (e.g. the prospect interacts with the email's contents) (i.e. "Yes"), at block 1108 in response, an introduction from the personal message side of credibility cube can then be automatically rendered or otherwise presented to the prospect.

The personal message side in particular, and all sides of the credibility cube in general, can be presented and made available to the prospect in any suitable way. For example, in at least one embodiment, the prospect can be sent to, or presented with (e.g. via the prospect's browser), a prospect webpage and/or prospect functionality (e.g. application) provided by the CMS. The prospect webpage can be configured and utilized to automatically present some or all of the credibility cube to the prospect when the webpage is loaded.

After the introduction from the personal message side of the credibility cube has been automatically rendered or otherwise presented for the prospect at block 1108, at block 1110 the other sides of the credibility cube can be made accessible to the prospect. In other words, the credibility cube can be rendered or otherwise presented such that the prospect can freely interact with and experience each of the sides of the credibility cube. For instance, the prospect may choose to access and review each validated credibility claim on each of the reference sides to help him/her assess the entity's credibility profile.

Recall that in addition to the personal message, profile, and reference sides, a credibility cube such as the credibility cube 100 can include a feedback side that may be configured and utilized to allow the prospect to provide any feedback he/she might has back to the client. For example, the prospect may wish to convey to an indication of their overall assessment of, and/or suggestions about, the client's credibility profile (and thus credibility) after reviewing the client's validated credibility claims. Alternatively or additionally, the prospect may wish to provide specific comments about specific credibility claims and/or offer advice to the client regarding the credibility cube and/or the client's overall experience, candidacy, services provided, products provided, etc.

Accordingly, here in this example at block 1112 the prospect may optionally choose to access and utilize functionality of the credibility cube's feedback side to provide their feedback for the client. The prospect can provide the feedback to the client in any suitable way. For example, in an embodiment where the reference is sent to, or presented with, a prospect webpage, the prospect might be asked to record, type, and/or otherwise document and submit their feedback via functionality (e.g. a "submit" control) on the prospect webpage.

In at least one embodiment, functionality on the prospect webpage might be utilized by the reference to record each response. For example, the above-mentioned interactive media tools might be utilized by the reference to accomplish this. Alternatively or additionally, the documented feedback might be automatically submitted after being recorded. The submitted feedback might then be automatically sent to the client and/or CMS.

As another example, the prospect might be asked to record, type, and/or otherwise document and submit their feedback by sending an email or other type of message back to the client and/or CMS. In such an example, the prospect might have recorded or otherwise documented the feedback via the credibility cube and/or other functionality provided on a computing device (e.g. mobile device, desktop computer, tablet device, phone, via the cloud, etc.).

Example Credibility Framework or System

The credibility techniques described herein can be implemented in any suitable way. For example, as described above, one or more of the described methods, processes, and/or systems may be implemented at least in part by one or more credibility manifestations (e.g. credibility cube(s)) and an automated CMS, such as the credibility cube 100 and CMS described above for instance.

Figure 12:
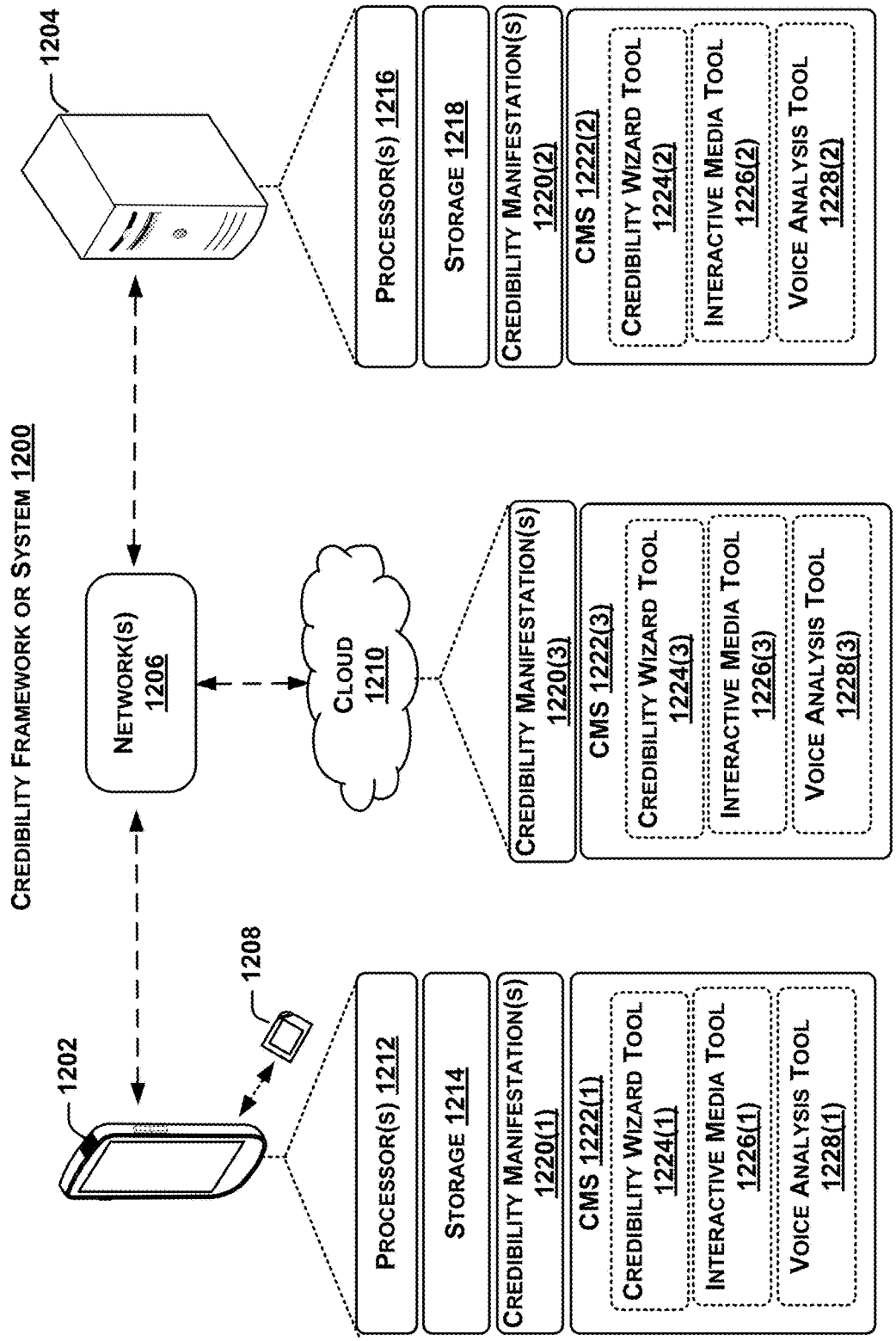
FIG. 12 illustrates an example framework or system in which the described techniques and embodiments may be implemented, in accordance with at least one embodiment.

In at least one embodiment, the credibility manifestation and CMS can be implemented in a framework or system that is associated with one or more computing devices. Accordingly, to facilitate the readers' understanding of such a framework or system, FIG. 12 illustrates an example credibility framework or system 1200 in which such a manifestation and CMS can be implemented.

More particularly, the credibility system 1200 in this example includes multiple computing devices, represented here as computing devices 1202 and 1204. These computing devices can function in a stand-alone or cooperative manner to implement the described credibility techniques.

Note that here, computing device 1202 is shown embodied as a mobile smart phone computing device. Computing device 1204, in turn, is shown embodied as a server computing device. However, this is not intended to be limiting, and it is to be appreciated and understood that the computer-implemented credibility system 1200 can include any number and type(s) of computing devices.

In this regard, the term "computing device", as used herein, can mean any type of device or devices having some amount of computer processing capability. Examples of computing devices can include personal computers (desktop, portable laptop, etc.), mobile/cellular phones, smart phones, tablets, laptops, tablets, personal digital assistants, and/or any of various ever-evolving or yet to be developed types of computing devices.

In this example, computing devices 1202 and 1204 can indirectly and/or directly exchange data via one or more network(s) 1206 and/or by any other suitable means, such as via external storage 1208 for instance. Without limitation, network(s) 1206 can include one or more local area networks (LANs), wide area networks (WANs), the Internet, and/or the like. Examples of external storage 1208 can include optical storage devices (e.g., CDs, DVDs etc.) and flash storage devices (e.g., memory sticks or memory cards), or the like.

Additionally or alternatively, computing devices 1202 and/or 1204 can exchange data with other resources associated with the cloud 1210, for example via network(s) 1206. As used herein, the cloud 1210 refers to computing-related resources/functionalities that can be accessed via network(s) 1206, although the location of these distributed computing resources and functionalities may not be readily apparent.

Here, computing devices 1202 and 1204 can each include a processor(s) (i.e., central processing unit(s)) and storage. More particularly, here computing device 1202 includes processor(s) 1212 and storage 1214. Similarly, computing device 1204 includes processor(s) 1216 and storage 1218. Processor(s) 1212 and 1216 can execute data in the form of computer-readable instructions to provide the functionality described herein.

Data, such as computer-readable instructions, can be stored on storage 1214 and/or 1218. Storage 1214 and/or 1218 can include one or more of volatile or non-volatile memory, hard drives, optical storage devices (e.g., CDs, DVDs etc.), or the like.

Devices 1202 and 1204 can also be configured to receive and/or generate data in the form of computer-readable instructions from one or more other storages, such as the external storage 1208 for instance. These computing devices may also receive data in the form of computer-readable instructions over the network(s) 1206 that are then stored on the computing device(s) for execution by the processor(s).

As used herein, the term "computer-readable media" can include transitory and non-transitory instructions. In contrast, the term "computer-readable storage media" excludes transitory instances. Computer-readable storage media can include one or more "computer-readable storage devices". Examples of computer-readable storage devices include volatile storage media, such as RAM, and non-volatile storage media, such as hard drives, optical discs, flash memory, and the like.

Note that in this example, computing device 1202 is shown as being configured to implement at least part of one or more credibility manifestations 1220 and/or a CMS 1222 (i.e. as credibility manifestations 1220(1) and/or CMS 1222(1)). Computing device 1204 is also shown as being configured to implement at least part of the credibility manifestation(s) 1220 and/or the CMS 1222 (i.e. as credibility manifestations 1220(2) and/or CMS 1222(2)). Additionally, at least part of the credibility manifestation(s) 1220 and/or the CMS 1222 is shown in this example as being implementable by one or more distributed computing resources of the cloud 1210 (i.e. as credibility manifestations 1220(3) and/or CMS 1222(3)).

With respect to the CMS 1222, recall that a CMS can include, without limitation, credibility coaching and management services that can be provided at least in part via a credibility wizard tool, interactive media tool, and/or a voice analysis tool. Accordingly, in this example the CMS 1222 is shown as including a credibility wizard tool 1224, an interactive media tool 1226, and a voice analysis tool 1228. Thus, each of these tools can be implemented at least part by one or more of the computing devices and/or other resources credibility framework or system 1200.

Example CMS Algorithms

To assist the reader in understanding the described credibility techniques, FIGS. 13-18 illustrate example CMS algorithms. In at least one embodiment, one or more of these algorithms may be utilized to perform at least some functionality associated with the CMS, and/or one or more of the described tools of the CMS. As such, each these algorithms may be configured and utilized to perform at least a portion of one or more of the processes, techniques, or methods described herein.

For discussion purposes, these example CMS algorithms are presented and described in the context of a "wizard" and "credibility coach" associated with functionality that can be provided via a credibility wizard tool, as described herein. Furthermore, the term "CRED3" as used herein with respect to the example CMS algorithms may refer to functionality and client services associated with the described credibility techniques.

Figure 13:
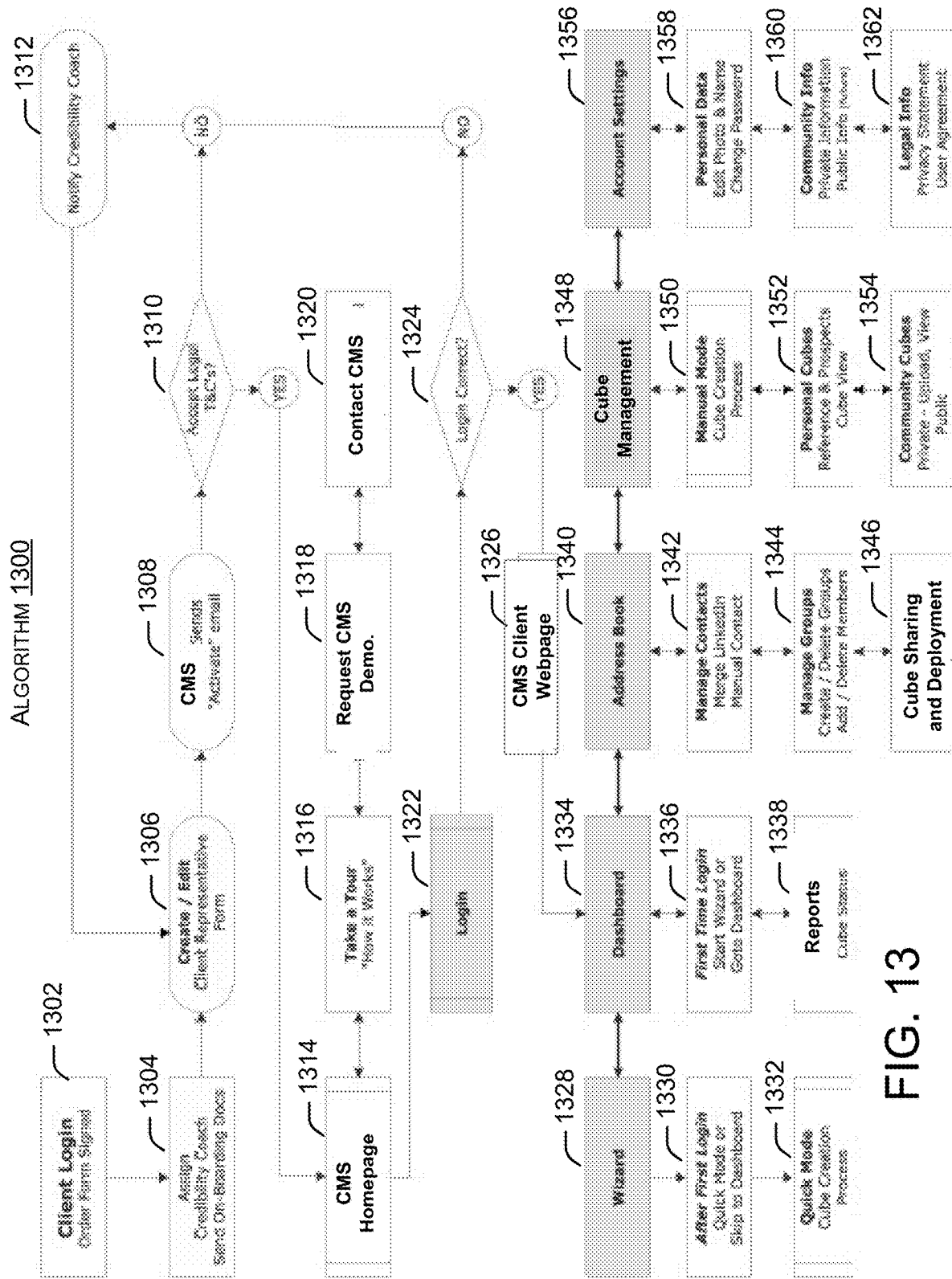
FIGS. 13-18 each illustrate an example algorithm, in accordance with at least one embodiment.

Referring now to FIG. 13, algorithm 1300 provides algorithmic steps (i.e. steps) associated with a client creating a CMS account and accessing CMS functionality on various CMS webpages. More particularly, at 1302 a client login is provided to a client and a client form may be signed by the client. Responsive to step 1302, at step 1304 the client can be automatically assigned a credibility coach and sent on-boarding documents (i.e. docs) which may request information from the client necessary to provision the online account including email, password, phone number, and the like. In addition, an on-boarding document may outline one or more credibility questions that will be asked via a credibility cube and that aligns with credibility claims that may be made by the client about their credibility, such as claims about the client's character, credentials, competence, and/or consistency for instance. Note that the client's assigned credibility coach may be a person and/or functionality provided by the CMS (e.g. via the CMS's credibility wizard tool). At step 1306, a client representative form may be created and can include questions and information for provisioning of the online account. At step 1308, the CMS can send an email to the client indicating that the client's account with the CMs has been activated. This email can be referred to as an "Activate" email. At step 1310, the client may determine and indicate whether or not they accept the CMS's legal terms and conditions (T&Cs) associated with their CMS account.

If at determination step 1312 the client determines and indicates that they do not accept the T&Cs ("No"), at step 1312 the credibility coach can be notified in order to address any questions by the client related to the T&C document and step 1306 repeated. However, if at determination step 1312 the client determines and indicates that they accept the T&Cs ("Yes"), at step 1314 home a webpage for the CMS (i.e. CMS homepage) can be provided to the client (e.g. rendered via the client's browser application). The homepage can include, for instance, a link and/or functionality at step 1316 that, when selected, allows the client to take a tour that explains how the CMS works ("How it Works").

If the client selects the tour option functionality at step 1316, the client can also be provided with the option of requesting a demo (e.g. by selecting a request control, link, or other functionality that causes a request email to be sent to the CMS) of the CMS at step 1318. When making the request, the client can also be provided with an option to contact the CMS at step 1320 (e.g. by selecting a request control. link, or other functionality that causes a request email to be sent to the CMS).

The homepage can also include a login link and/or functionality at step 1322 that, when selected, allows the client to log into the CMS. Once the client enters their username and password to login at step 1322, at determination step 1324 the CMS can automatically determine whether the login is correct based on whether or not the username and password entered by the client at step 1322 are current and recognized as being authentic.

If the CMS determines at step 1324 that the login is not correct ("No"), at step 1312 the credibility coach can be notified and step 1306 repeated. However, if the CMS determines at step 1326 that the login is correct ("Yes"), at step 1326 a CMS client webpage can be provided (to the client (e.g. rendered via the client's browser application).

As shown, various types of on-line features, or functions, can be provided to the client via the CMS client webpage. More particularly, at step 1328 various credibility wizard functions (i.e. "Wizard") associated with the credibility wizard tool can be made available to the client. For example, as shown here, at step 1330 the client can be provided with functionality by the credibility wizard tool to create a first credibility profile for a credibility cube. If a credibility cube already exists then the user can be taken directly to the dashboard to view, create, share, and/or deploy a credibility cube. In this regard, at step 1332 a quick mode credibility cube creation function can be utilized by the client to quickly and easily create a new credibility cube.

In addition to the credibility wizard functionality, at step 1334 functionality associated with a credibility dashboard (i.e. "Dashboard") can be made available to the client via the CMS client webpage. For example, here at step 1336 first-time login functionality can be provided to allow the client to easily access credibility wizard functionality to create their first credibility cube and/or be taken to the dashboard functionality after the client's first credibility cube has been created. In addition, at step 1338 report functionality associated with differing reports are available including, but not limited to, number of cubes deployed, times each cube has been viewed, by individual user (e.g. the client), by time and by date, cumulative cube value of all viewed cubes, and other statistics related to cube deployment and views by prospects.

At step 1340 address book functionality can also be made available to the client via the CMS webpage. This address book functionality can include contact management functionality at step 1342, group address management functionality at step 1344, and information related to cube sharing and cube deployment statistics at step 1346.

Continuing, at step 1348 cube management functionality can be made available to the client via the CMS webpage. This cube management functionality can include manual credibility cube creation functionality at step 1350, where a client can select "Add Cube" to create a new cube of any type view and playback a reference recording that has been recorded. This cube management functionality can also include reference and prospect-related functionality at step 1352, where a client can view a cube that has been deployed to a prospect, including playing the cube in a demonstration (demo) mode on a separate cube, and sharing and deployment functionality, including private and/or public viewing and cube set up, at step 1354.

Finally, at step 1356, account setting functionality (i.e. "Account Settings") can also be made available to the client via the CMS webpage. This account setting functionality can include personal data editing functionality at step 1358, including the ability to add a photo or logo and/or change a password and add additional descriptive information. Functionality at step 1360 can include editing information for notes and personal control, while functionality at step 1362 can include accessing the CMS's privacy statement and user agreement.

Figure 14:
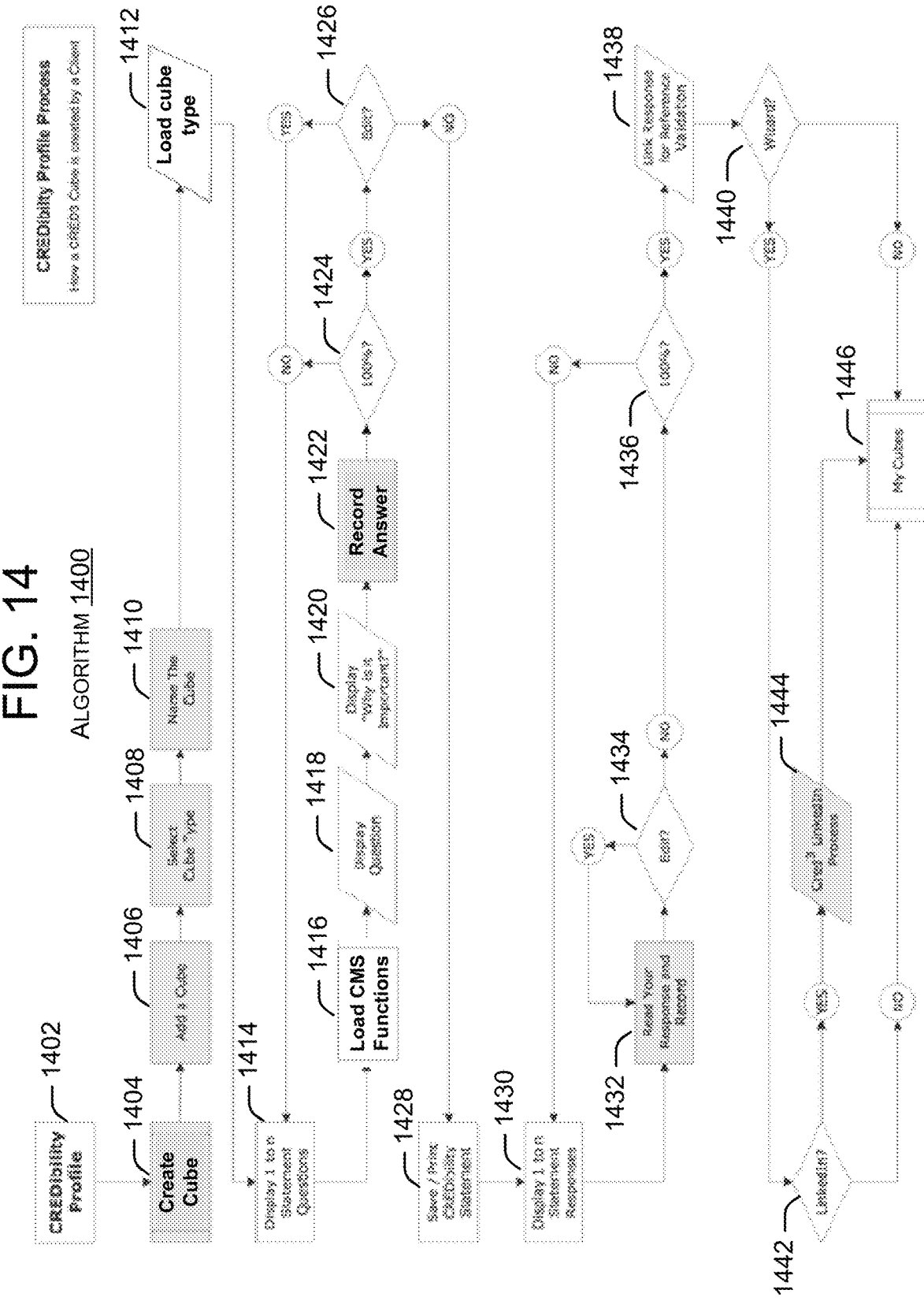

Referring now to FIG. 14, algorithm 1400 provides algorithmic steps (i.e. steps) associated with a client creating a credibility cube (i.e. "CREDibility profile") by utilizing CMS functionality. More particularly, the client can utilize the credibility wizard tool and/or other CMS functionality for cube creation after logging in and selecting the ability to add a cube under cube management screens (e.g. "Cube Management" at step 1348).

Continuing, at step 1404 manual or wizard-based cube creation functionality includes the CMS facilitating the client in deciding to add a cube at step 1406, selecting a cube type at step 1408, and/or naming the new cube at step 1410. After these steps, the CMS can load or display the credibility cube type at step 1412 and begin displaying each of the credibility questions (i.e. "Display 1 to n Statement Questions") for steps 1416 through 1426 in order (i.e. 1 to n) at step 1414.

For each credibility question loaded or displayed at step 1414, CMS functions (i.e. CMS functionality), such as general or client-specific (CMSS) methodology for instance, can be loaded at step 1416. The current loaded or displayed credibility question can be displayed individually at step 1418 and an explanation as to why the current credibility question is important can be provided at step 1420. Step 1422 can be associated with recording the client's answer(s) to the current credibility question.

Decision points at 1424 and 1426 can facilitate the client in creating and modifying answers and recordings for the creation of their credibility profile. Save and print functionality at 1428 can facilitate the offline ability to ensure answers and credibility claims are appropriate and/or correct for the client's purpose. Step 1430 allows individual statement responses by the client to by displayed and reviewed to help ensure the appropriate and correct for the client's purpose.

The process can continue at steps 1432 and 1434 by allowing the client to record video answers, and redo their videos if unacceptable until correct. Once correct, the user can continue to steps 1436, 1438, 1440, and/or 1444 that link the credibility claim that the client makes to the questions that will be asked of the references to validate those claims. Finally the credibility cube can be created and made available/ready for reference request at step 1446.

Figure 15:
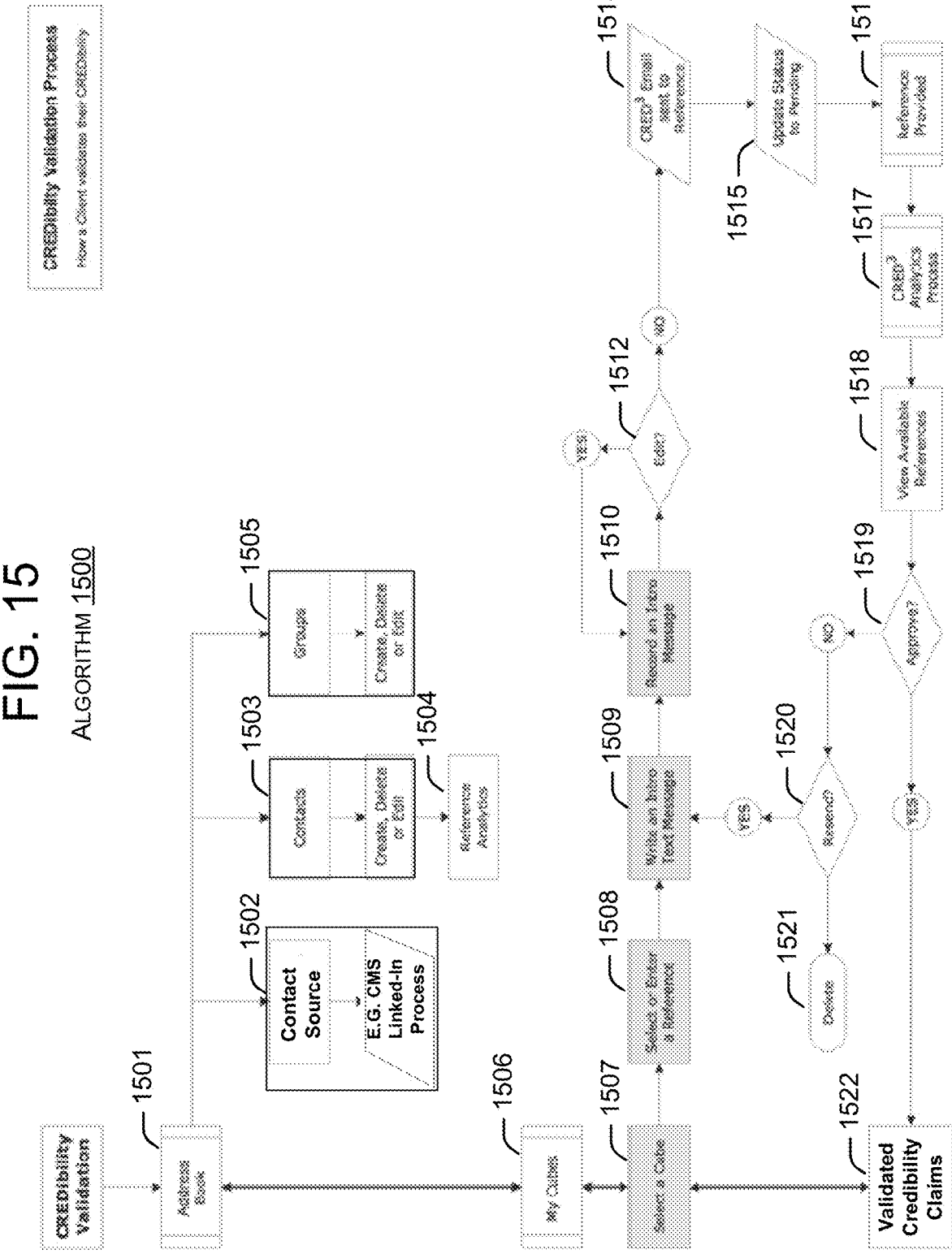

Referring now to FIG. 15, algorithm 1500 provides algorithmic steps (i.e. steps) associated with credibility validation of a client's credibility cube. This can include address book functionality associated with the creation and management of contacts in one or more address books or other type(s) of contact sources for reference requests and credibility cube deployments.

More particularly, address book functionality can include contact source functionality associated with downloading contacts from a social networking website (e.g. LINKEDIN) or other type of contact source to the CMS at step 1502. At step 1503, contacts can be manually created or deleted, and at step 1504 reference analytics can be used to, for example, clarify contact information and/or gather/find additional contact information. At step 1505, contacts can be added to groups for ease of management, sharing and cube deployment.

At step 1506, credibility cube functionality associated with the client (i.e. "My Cubes") can be provided. For example, functionality at step 1507 can be associated with the ability to select a credibility cube to request a reference for validation of credibility claims made in the credibility profile creation process by the client (e.g. steps 1414 thorough 1426). Steps 1508 through 1512 can allow the client to enter a text based message and/or a video based message that will be sent to the reference by email at step 1514 requesting that they respond to the questions posed.

At step 1515 the reference can be shown as a pending response, and after reference responses are provided by the reference at step 1516 to validate the credibility claims, a credibility analytics process can be invoked at step 1517 to provide analytics via the CMS, such as voice analytics and/or credibility coaching analytics for instance. After the validation is completed and the analytics provided at step 1517, at steps 1518 through 1521 the validated credibility claims can be approved and made available at step 1522 to be added to the cube for deployment.

Figure 16:
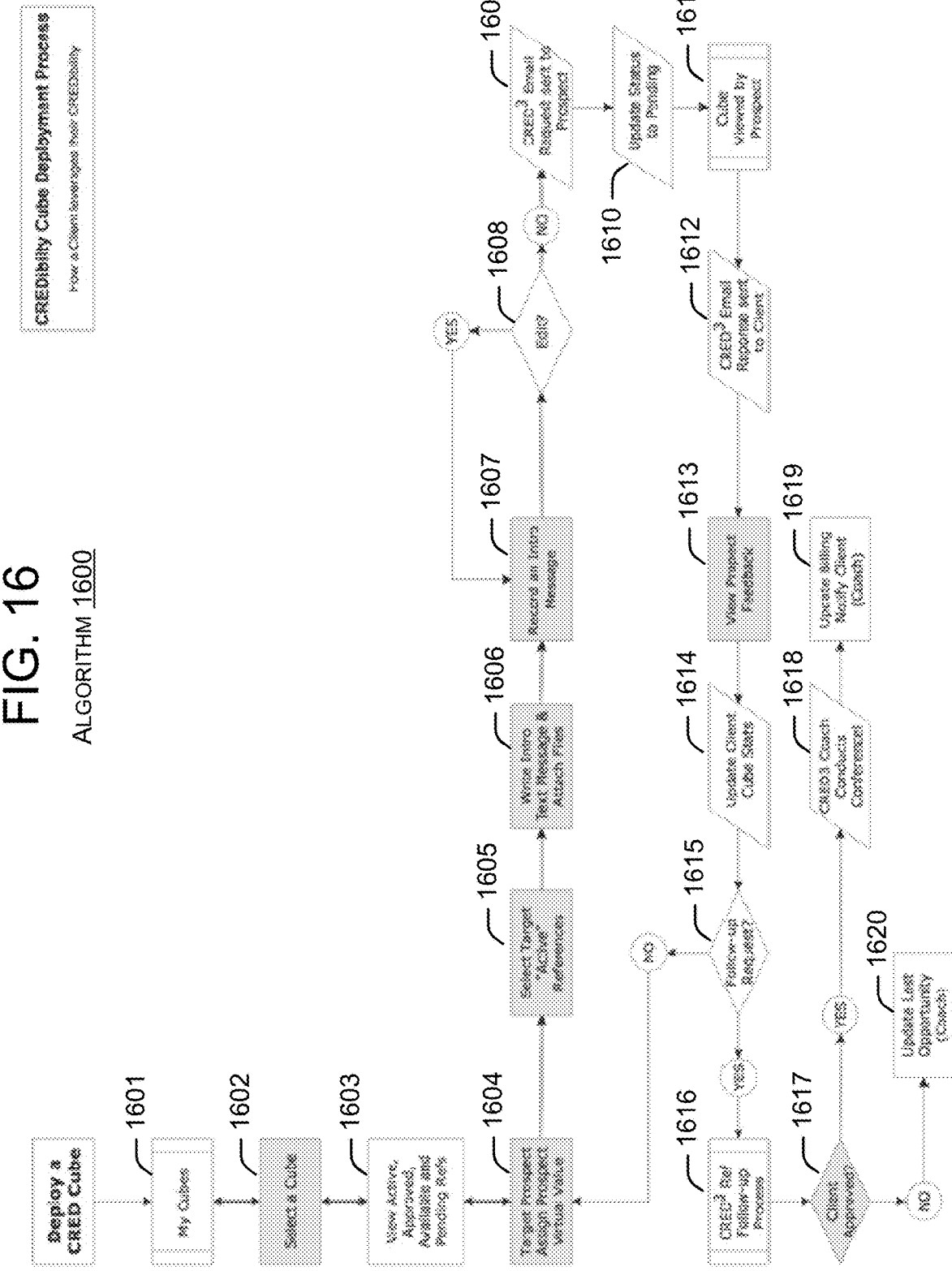

Algorithm 1600, as illustrated in FIG. 16, provides algorithmic steps (i.e. steps) associated with the deployment of a credibility cube by a client to a prospect. More particularly, at step 1601 CMS credibility cube management functionality can be made available (e.g. via step 1348). This can include functionality allowing the client to select a credibility cube via the credibility cube functionality at step 1602.

Once the client selects a credibility cube at step 1602, at step 1603 active, approved, available, and pending reference responses can be viewed. At step 1604 a prospect can be identified and assigned a prospect virtual value. At step 1605 the desired active reference responses can be selected. At step 1606 an introductory message to the prospect can be written by the client and the selected available "active" reference responses can be added to the credibility cube before the written introductory video message is recorded at step 1607 as a personalized video message to the prospect. The client can edit the video message any number of times at step 1608, and once completed sent via email to the prospect at step 1609 (e.g. by the client selecting a "send" button or other type of online control). After being sent, the status of the credibility cube cane be updated as "pending" at step 1610.

Continuing, at step 1611 the prospect may open the email with the credibility cube (including the recorded personalized introductory message) and view the credibility cube (e.g. via a web browser). At step 1611 the prospect can optionally enter feedback to the client in the credibility cube and send the feedback and/or the credibility cube back to the client and/or CMS at step 1612. Once the viewed credibility cube is received back by the client and/or CMS, the prospect's feedback (if any) can be viewed at block 1613 and the status of the credibility cube status can be updated at step 1614 and the client may choose whether or not to follow up with the prospect at step 1615.

Figure 17:
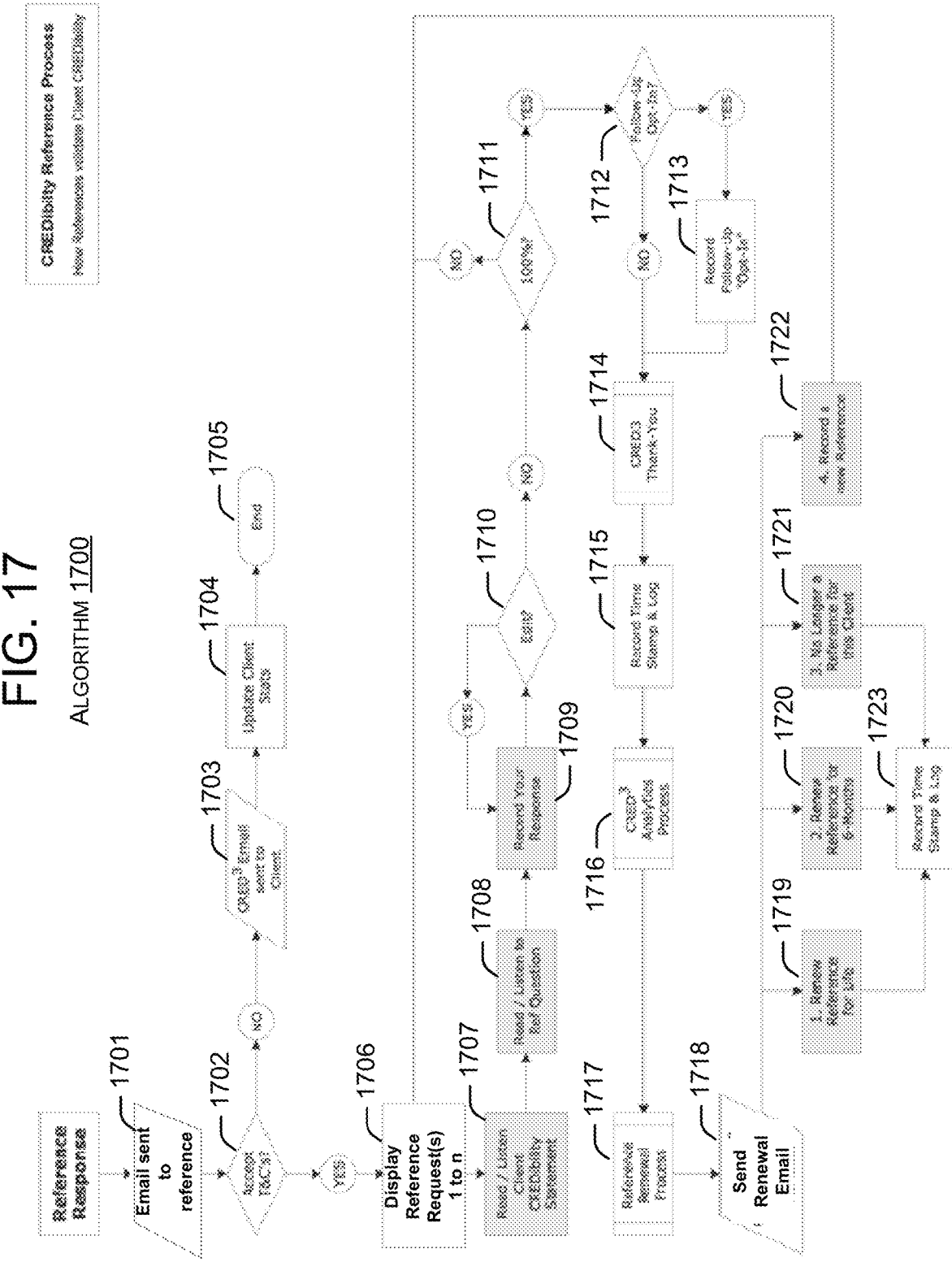

If the client does not choose to follow up at step 1615, steps 1604 through 1614 can be repeated any number of times. If the client chooses to follow up at step 1615 however, at step 1616 the CMS will send an email to follow up with the prospect upon clients approval at 1617. If the client approves the total process then credibility coaching and/or management services provided via the CMS's credibility wizard tool can contact the client at 1618 and update the client at step 1619 that a new cube has been added, and that the will be billed for that additional cube. Otherwise at step 1620 the prospect is lost and the cube is not needed, Algorithm 1700, as illustrated in FIG. 17, provides algorithmic steps (i.e. steps) associated with CMS functionality associated with a reference receiving a reference request and reference renewal request. More particularly, at step 1701 a credibility email from the client of the CMS and/or from the CMS that includes the client's reference request can be sent to, and received by, a reference. The client's reference request can be sent to the selected reference(s) in any suitable format that conveys to the reference(s) that the client and/or CMS would like the reference to respond.

At step 1702, the reference can determine whether or not to accept the CMS's T&Cs that may, for instance, permit public use of the reference's recorded response(s) (e.g. video). For example, the T&Cs may permit various prospects to receive and the recorded response(s). If the reference is not willing to accept the T&Cs, the CMS can notify the client of this at step 1703 and update the status of the credibility cube at step 1704 before the algorithm 1700 ends at step 1705.

If the reference is willing to accept the T&Cs however, at step 1706 each of the client's recorded reference requests (1-n) can be displayed to the reference. In at least one embodiment, for each displayed reference request, the reference can be provided with the ability to experience (i.e. read and/or listen to) the client's credibility claim (i.e. credibility statement) at step 1707 and reference question at step 1708. Each reference question can be a request to the reference to validate the credibility statement experiences by the reference at step 1707.

The reference can then be given the opportunity to record their response to each reference request at step 1709, and each response may be edited at step 1710 by the reference any number of times. Once the reference is satisfied and does not wish to edit their response, at step 1711 a determination can be made as to whether or not each reference request has been displayed to the reference (i.e. "100%"). If each reference request has not been displayed to the reference, steps 1706 through 1710 can be repeated until all the client's reference requests have been displayed.

If each reference request has been displayed to the reference however, at step 1712 (i.e. "record follow-up 'opt-in?'") the reference can be given the option of allowing a prospect who reviews the reference's response(s) to follow up with the reference as part of the sales or other process between the client and the prospect (e.g. to clarify the reference's response(s), ask additional questions about the client, etc.). If the reference chooses to opt-in for follow-up, this can be recorded by the CMS at step 1713 and a thank you message can be provided to the reference at step 1714. If the reference chooses to not opt-in for follow-up, a thank you message can still be provided to the reference at step 1714. In either case, the CMS can then record the date and time of the response (i.e. record time & log) at step 1715 and send the completed reference request (i.e. validated credibility claim) to the CMS for analysis, as described above.

For each reference response, after a period of time defined by the response's RRRED, the response may expire. Accordingly, at step 1717 reference renewal functionality can be provided by the CMS at step 1717. This can include the CMS sending a renewal email to the reference at step 1718 regarding a particular reference request (i.e. validated credibility claim) after a certain period of time from when the date and time of the response was recorded at step 1715.

Once the renewal email has been received by the reference, the CMS can provide the reference the option (i.e. options 1-4) of responding with a renewal response in accordance with one of steps 1719, 1720, 1721, or 1722. Once the reference responds with a renewal response in accordance with one of these steps, the renewal date and time of the renewal response can be recorded by the CMS (i.e. record time and stamp log) at step 1723.

Figure 18:
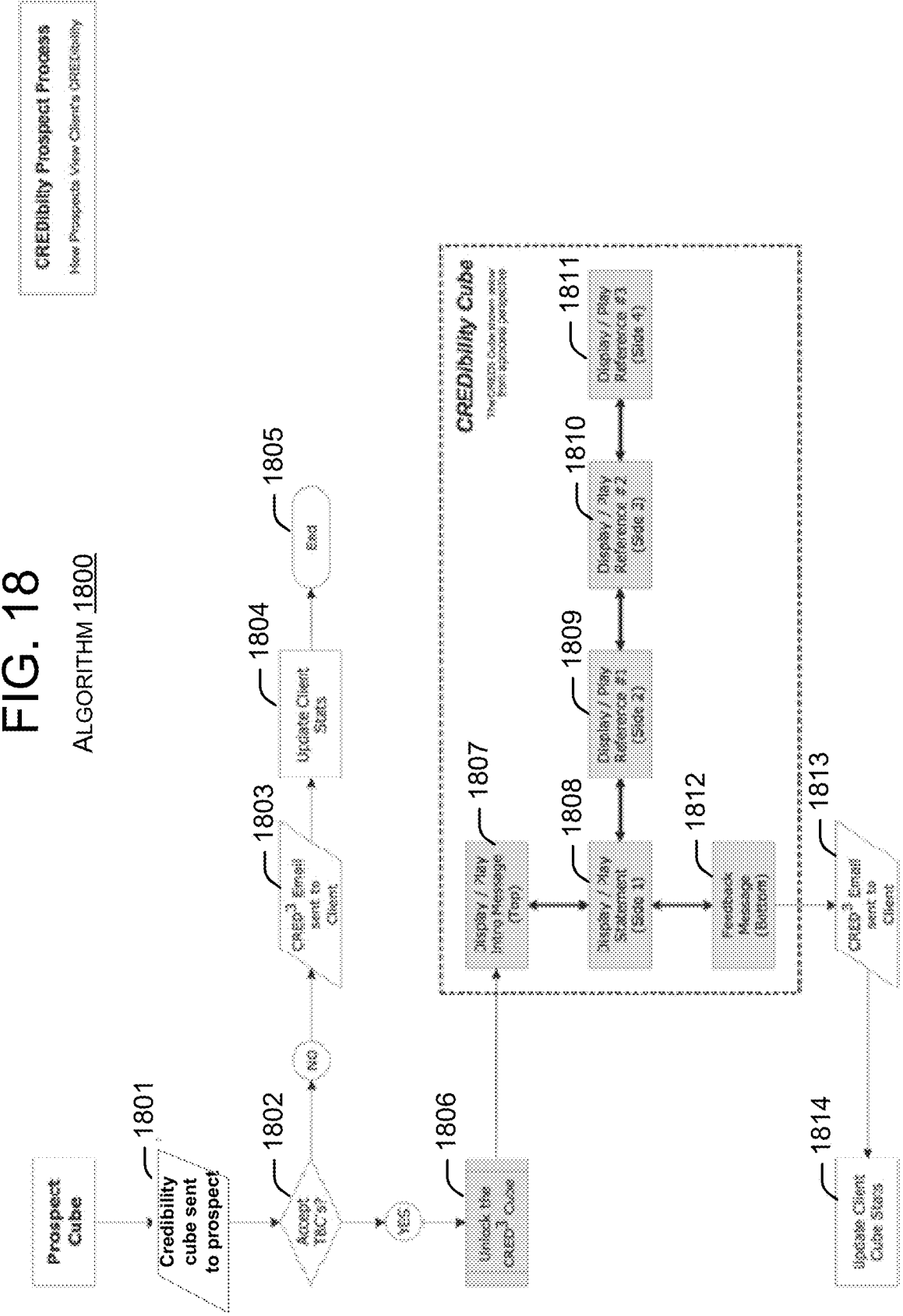

Referring now to FIG. 18, algorithm 1800 provides algorithmic steps (i.e. steps) associated with a prospect receiving a credibility cube from a client. At step 1801, the credibility cube can be sent to the prospect via a credibility email to the client. As explained above, the credibility cube might have been sent by the client via the CMS, or for the client by the CMS. At step 1802, the prospect can determine whether or not they are willing to accept the CMS's T&Cs that may, for instance, permit public use of the credibility cube. If the prospect is not willing to accept the T&Cs, the CMS can notify the client of this at step 1803 and update the status of the credibility cube at step 1804 before the algorithm 1800 ends at step 1805.

If the prospect is willing to accept the T&Cs however, at step 1806 functionality that unlocks the credibility cube and allows the prospect to engage the cube can be provided. For example, at block 1807 in response to the prospect engaging the cube, an introduction from the personal message side of the credibility cube can then be automatically rendered or otherwise presented (e.g. displayed and played) to the prospect (i.e. display/play intro message").

After the personal message side of the credibility cube has been automatically rendered or otherwise presented at step 1807, at steps 1808 through 1812 one or more other sides of the credibility cube can be made accessible to the prospect. Once the prospect is finishing engaging the credibility cube (e.g. has closed the browser, etc.), at step 1813 an email can be sent to the client explaining that the credibility cube was engaged by the prospect. Statistics in the CMS associated with the credibility cube and/or client can then be updated by the CMS at step 1814.

What is claimed is:

1. A credibility system, comprising:
   at least one processor;
   one or more computer-readable storage media having instructions executable by the at least one processor, the instructions comprising:
   electronically communicating an interactive link to a prospect configured to present at least one three-dimensional credibility profile via an interactive user interface in a browser to represent and convey an entity's credibility profile to the prospect responsive to a user interaction with the interactive link, the interactive link configured to expire without the user interaction after a predefined amount of time;
   responsive to the user interaction with the interactive link, automatically rendering a first side of the at least one three-dimensional credibility profile comprising a personal message from the entity to the prospect, the at least one three-dimensional credibility profile configured to automatically present the personal message;
   responsive to completion of the personal message, automatically providing the prospect access to one or more other sides of the at least one three-dimensional credibility profile, automatically rendering access comprising presenting one or more of the following responsive to one or more additional user interactions with the at least one three-dimensional credibility profile:
- a second side comprising a credibility claim by the entity about the entity's credibility and a credibility disclosure statement by the entity about a relationship between the entity and at least one reference, wherein the credibility claim comprises a voice recorded answer by the entity to a credibility question, and wherein the at least one reference does not comprise the entity or the prospect;
- a third side comprising a feedback request and at least one control configured to permit the prospect to provide feedback associated with the credibility claim; and
- at least one additional side comprising a validated credibility claim, the validated credibility claim comprising a recorded response by the at least one reference validating the credibility claim by the entity, the at least one three-dimensional credibility profile configured to present the recorded response responsive to the prospect interacting with the at least one additional side via the interactive user interface; and presenting a credibility management system (CMS) via the interactive user interface, the CMS configured with algorithmic steps implemented by the at least one processor and the memory to:
- ask the entity the credibility question and provide credibility coaching services, wherein the credibility coaching services comprise providing an explanation about the credibility question and providing one or more sample answers to the credibility question; and
- analyze the voice recorded answer to the credibility question and provide voice analysis feedback to the entity about voice characteristics of the recorded response.

2. The credibility system of claim 1, wherein the at least one three-dimensional credibility profile comprises a credibility cube.

3. The credibility system of claim 1, wherein the validated credibility claim further comprises the credibility claim.

4. The credibility system of claim 1, wherein the third side is further configured to automatically submit the feedback to the CMS responsive to being provided by the prospect.

5. The credibility system of claim 1, wherein the CMS is further configured to perform at least part of one or both of: creating the at least one three-dimensional credibility profile or leveraging the three-dimensional credibility profile by electronically sending the three-dimensional credibility profile to the prospect.

6. A method of leveraging an entity's credibility, the method comprising:
creating a three-dimensional credibility profile configured to be implemented at least in part by a computing device and to represent and convey a credibility profile of an entity,
wherein creating the three-dimensional credibility profile is performed by algorithmic steps implemented by the computing device and comprises:
asking the entity a credibility question;
providing an explanation about the credibility question; providing one or more sample answers to the credibility question;
analyzing an answer by the entity to the credibility question and providing voice analysis feedback to the entity about voice characteristics of the answer; and
recording the answer on the three-dimensional credibility profile as credibility claim; and
electronically communicating an interactive link configured to present the three-dimensional credibility profile to a prospect via an interactive user interface in a browser responsive to a user interaction with the interactive link, the interactive link configured to expire without the user interaction after a predefined amount of time;
responsive to the user interaction with the interactive link, automatically rendering a first side of the at the three-dimensional credibility profile configured to automatically present a personal message to introduce the entity to the prospect;
automatically providing the prospect access to one or more other sides of the three-dimensional credibility profile at completion of the personal message, automatically providing access comprising rendering one or more of the following responsive to one or more additional user interactions with the three-dimensional credibility profile:
- a second side configured to comprise a credibility claim by the entity about the entity's credibility and a credibility disclosure statement by the entity about a reference, wherein the reference does not comprise the entity or the prospect;
- a third side configured to permit the prospect to provide feedback associated with the credibility claim; and
- a fourth side configured to represent a validated credibility claim comprising a reference response by the reference to the credibility claim.

7. The method of claim 6, further comprising:
recording a request associated with the reference response;
sending the recorded request to the reference;
receiving one or more potential reference responses to the recorded request; and
selecting the reference response from the one or more potential reference responses.

8. The method of claim 6, wherein at least a portion of creating the three-dimensional credibility profile is performed utilizing credibility coaching services provided by one or both of: a credibility wizard tool or a voice analysis tool.

9. The method of claim 6, wherein the three-dimensional credibility profile comprises a credibility cube.

10. The method of claim 9, wherein the credibility cube comprises:
a service credibility cube, wherein the credibility profile is associated with a service provided by the entity;
a product credibility cube, wherein the credibility profile is associated with a product provided by the entity;
an opportunity credibility cube, wherein the credibility profile is associated with an opportunity provided by the entity; or
an individual credibility cube, wherein the credibility profile is associated with an opportunity that the entity is seeking.

11. One or more computer-readable storage media having instructions stored thereon that, when executed by one or more computing devices, cause the one or more computing devices to perform steps comprising:
- determining a three-dimensional credibility profile type for a three-dimensional credibility profile, the three-dimensional credibility profile configured to represent and convey an entity's credibility profile to a prospect;
- preparing a credibility question associated with the three-dimensional credibility profile type;
- asking the entity the credibility question and providing credibility coaching services comprising:
  - providing an explanation about the credibility question; and
  - providing one or more sample answers to the credibility question;
- recording an answer by the entity to the credibility question on the three-dimensional credibility profile;
- validating the recorded answer on the on the three-dimensional credibility profile; and
- electronically communicating an interactive link configured to present the three-dimensional credibility profile to a prospect via an interactive user interface in a browser responsive to a user interaction with the interactive link;
- responsive to the user interaction with the interactive link, automatically rendering a first side of the three-dimensional credibility profile configured to automatically present a personal message to introduce the entity to the prospect, the interactive link configured to expire without the user interaction after a predefined amount of time;
- automatically providing the prospect access to one or more other sides of the three-dimensional credibility profile at completion of the personal message, automatically providing access comprising rendering one or more of the following responsive to one or more additional user interactions with the three-dimensional credibility profile:
  - a second side configured to comprise a credibility claim by the entity about the entity's credibility and a credibility disclosure statement by the entity about a reference, wherein the reference does not comprise the entity or the prospect;
  - a third side configured to permit the prospect to provide feedback associated with the credibility claim; and
  - a fourth side configured to represent a validated credibility claim by the reference to the credibility claim.

12. The one or more computer-readable storage media of claim 11, wherein one or more of the steps is performed by one or both of: a credibility wizard tool or voice analysis is tool.

13. The one or more computer-readable storage media of claim 11, wherein preparing the credibility question comprises selecting and customizing a proposed draft credibility question for the prospect.

14. The one or more computer-readable storage media of claim 11, wherein validating the recorded response comprises:
- recording personalized requests associated with the recorded response;
- sending each of the recorded personalized requests to one or both of: the reference or one or more other references;
- receiving responses to the personalized recorded requests; and
- selecting at least one of the received responses as the validated credibility claim.

* * * * *